US010287785B1

United States Patent
Tadros et al.

(10) Patent No.: US 10,287,785 B1
(45) Date of Patent: May 14, 2019

(54) REUSABLE LIFTING APPARATUS FOR INSULATED PRECAST CONCRETE SANDWICH PANELS

(71) Applicant: THiN-Wall, LLC, Omaha, NE (US)

(72) Inventors: Maher K. Tadros, Omaha, NE (US); Mark D. Lafferty, Lincoln, NE (US)

(73) Assignee: Thin-Wall, LLC, Omaha, NE (US)

( * ) Notice: Subject to any disclaimer, the term of this patent is extended or adjusted under 35 U.S.C. 154(b) by 0 days.

(21) Appl. No.: 15/726,048

(22) Filed: Oct. 5, 2017

Related U.S. Application Data

(60) Provisional application No. 62/404,565, filed on Oct. 5, 2016.

(51) Int. Cl.
  *E04G 21/14* (2006.01)
  *E04G 21/16* (2006.01)
  *E04B 1/41* (2006.01)
  *E04C 2/288* (2006.01)

(52) U.S. Cl.
  CPC .............. *E04G 21/165* (2013.01); *E04B 1/41* (2013.01); *E04C 2/288* (2013.01)

(58) Field of Classification Search
  CPC ... E04G 21/165; E04G 21/142; E04G 21/147; E04G 15/04; B66C 1/666; B66F 3/08; E04B 1/3511; E04B 1/41
  See application file for complete search history.

(56) References Cited

U.S. PATENT DOCUMENTS

| | | | | |
|---|---|---|---|---|
| 3,404,503 A | * | 10/1968 | Courtois | B28B 23/005 116/DIG. 14 |
| 4,173,856 A | * | 11/1979 | Fricker | E04G 21/142 248/499 |
| 5,857,296 A | * | 1/1999 | Niday | E04G 21/142 52/125.1 |
| 9,347,232 B1 | * | 5/2016 | Francies, III | E04G 21/142 |
| 2012/0306226 A1 | * | 12/2012 | Alba | B66C 1/66 294/215 |
| 2013/0174499 A1 | * | 7/2013 | Densmore | E04C 5/163 52/125.4 |
| 2015/0167260 A1 | * | 6/2015 | Siqueiros | E01C 5/06 404/73 |
| 2015/0284967 A1 | * | 10/2015 | Kim | E04C 5/12 52/125.4 |
| 2016/0230380 A1 | * | 8/2016 | Mahrenholtz | E04G 15/04 |

* cited by examiner

*Primary Examiner* — Gisele D Ford
(74) *Attorney, Agent, or Firm* — Suiter Swantz pc llo

(57) ABSTRACT

A reusable lifting apparatus includes a first mount assembly embedded within a first layer of a concrete sandwich panel and a second mount assembly embedded within a second layer of a concrete sandwich panel. The reusable lifting apparatus includes a lifting insert insertable within a void in one or more insulation layers between the first layer and the second layer. The reusable lifting apparatus includes a lifting bolt couplable to at least one of the first mount assembly, the second mount assembly, or the lifting insert through a hole in the first layer. The lifting insert is pivotable within the void about an axis through the lifting bolt. The lifting insert and the lifting bolt are removable from the concrete sandwich panel so as to eliminate thermal bridging between the first layer and the second layer via the lifting insert and the lifting bolt.

20 Claims, 28 Drawing Sheets

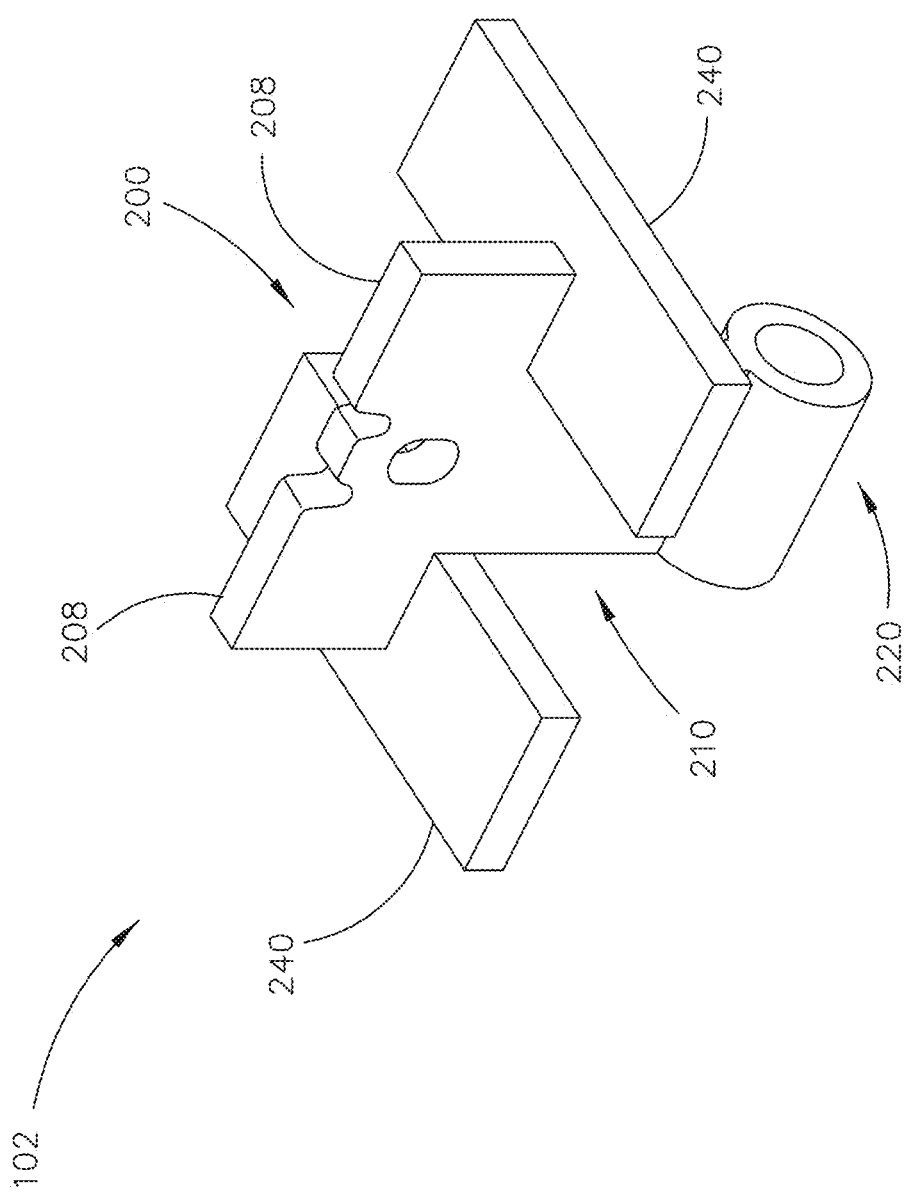

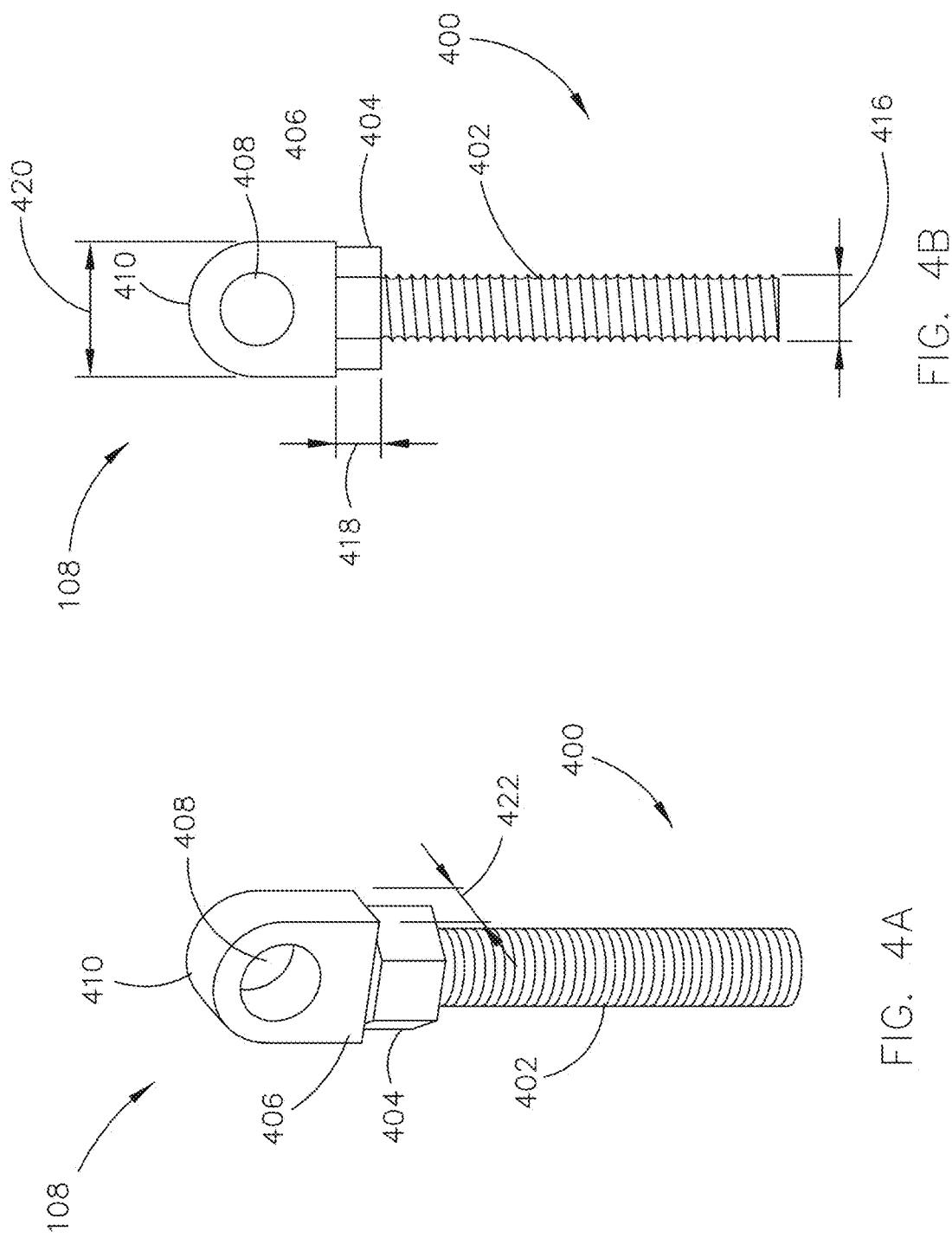

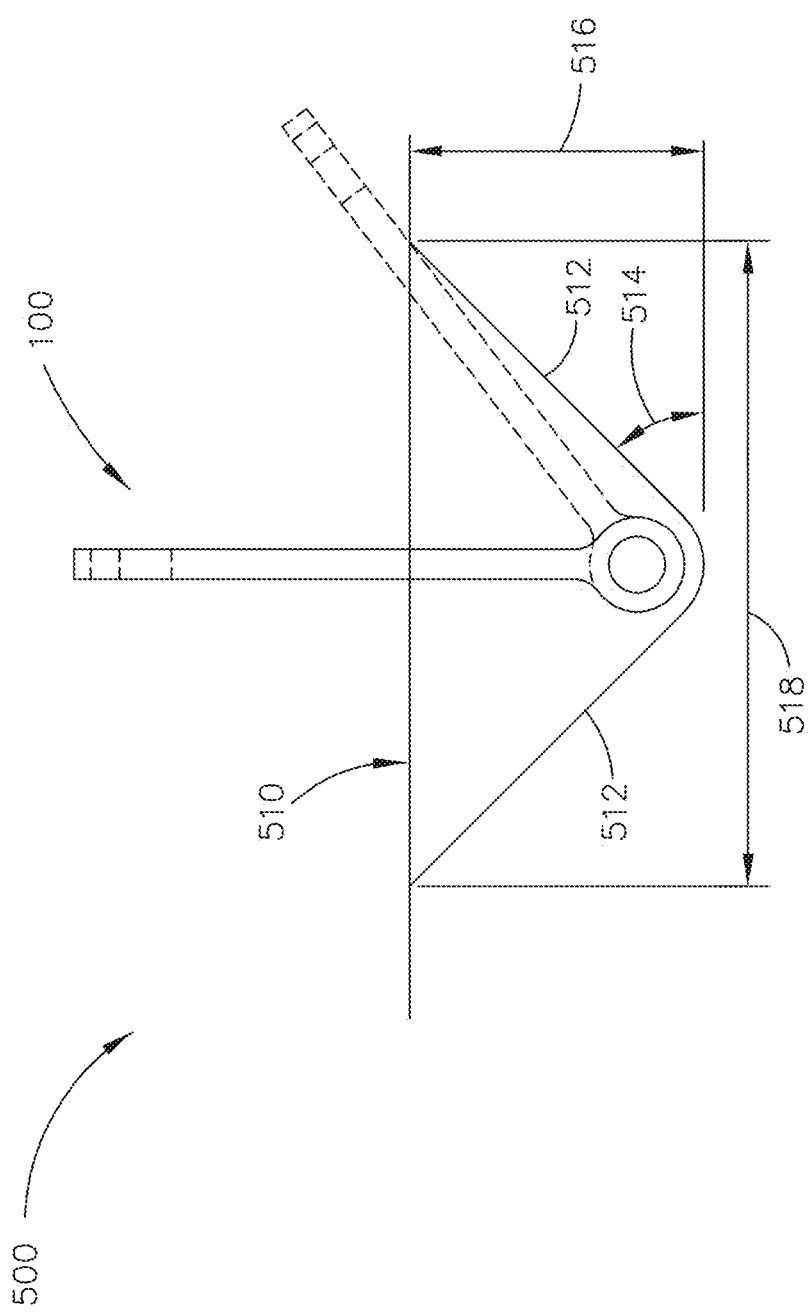

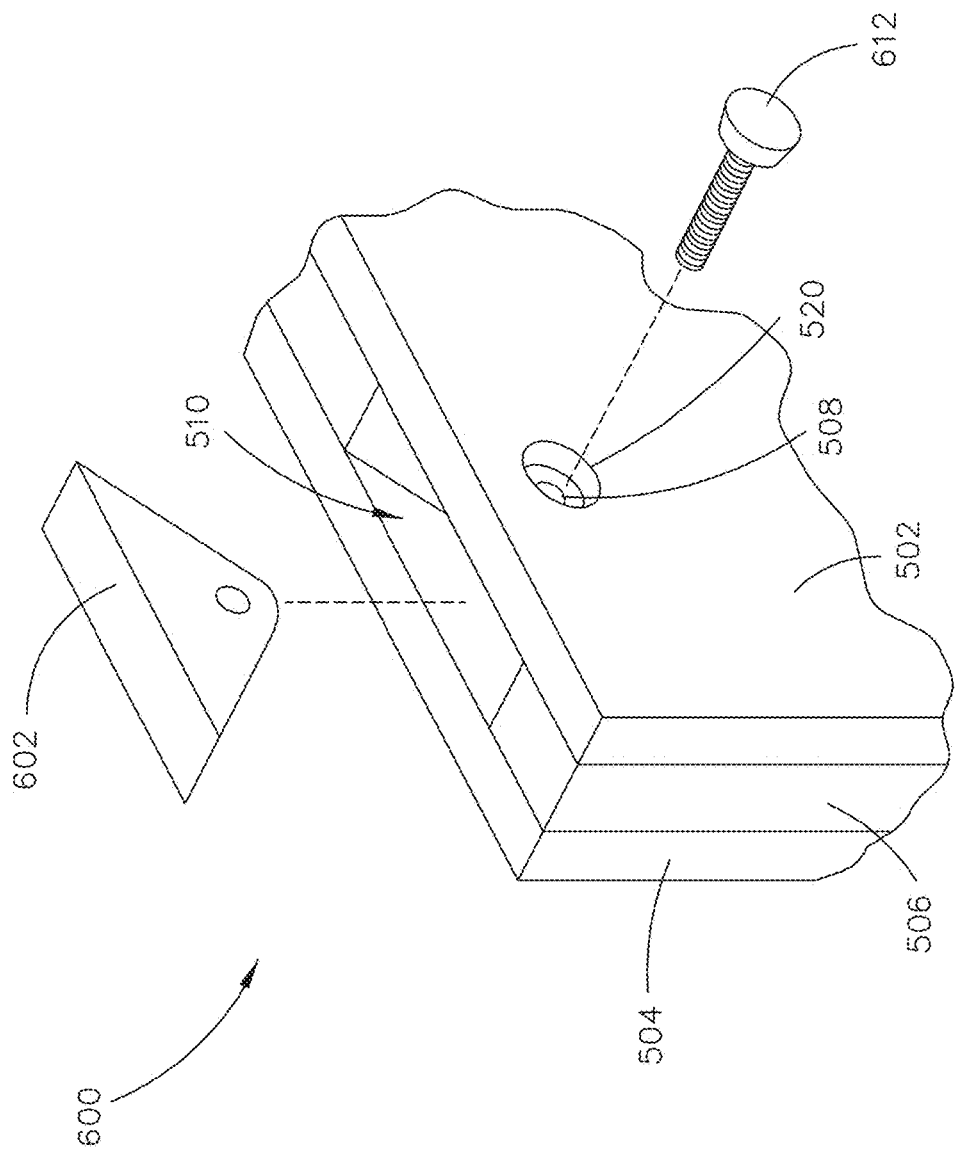

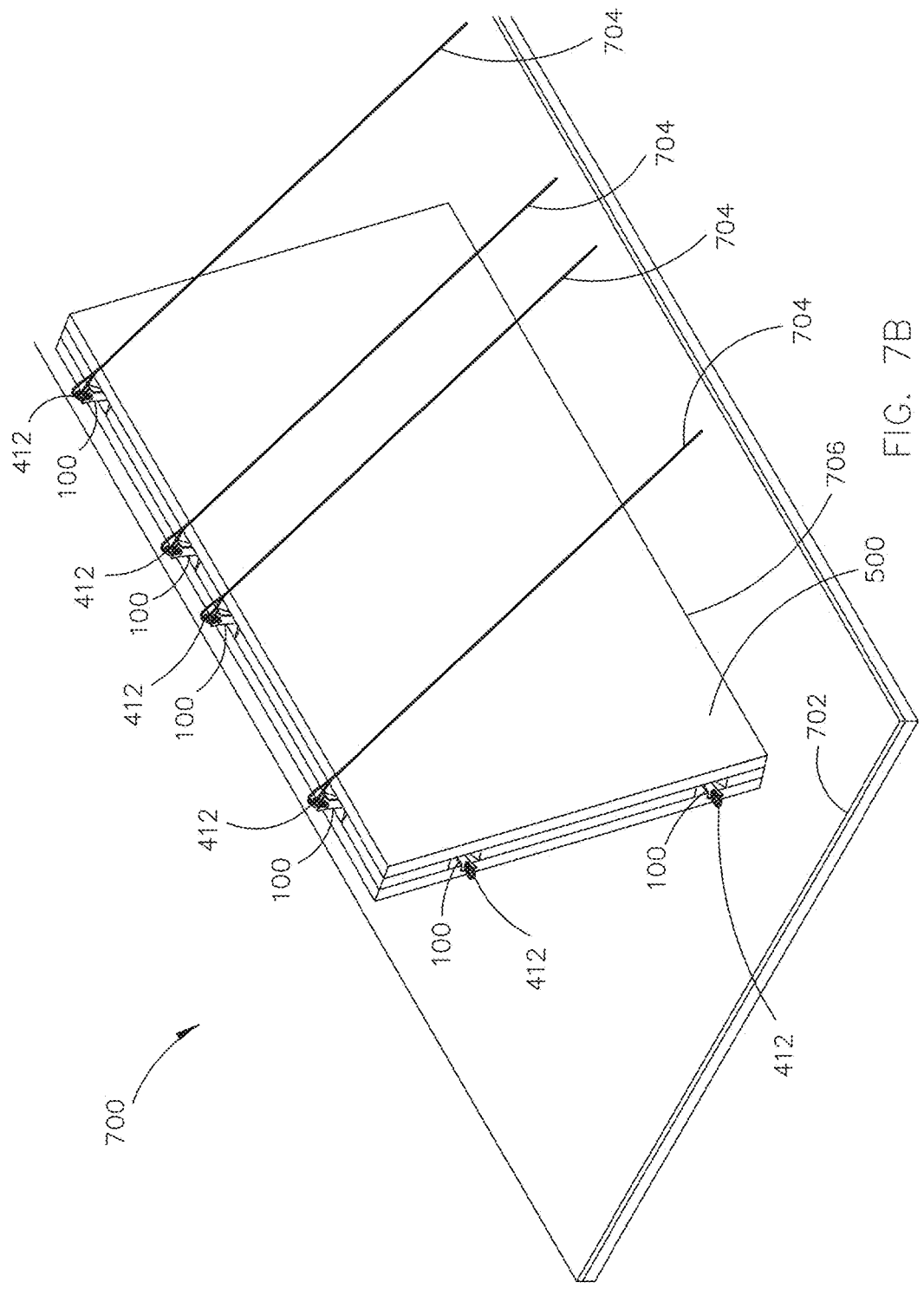

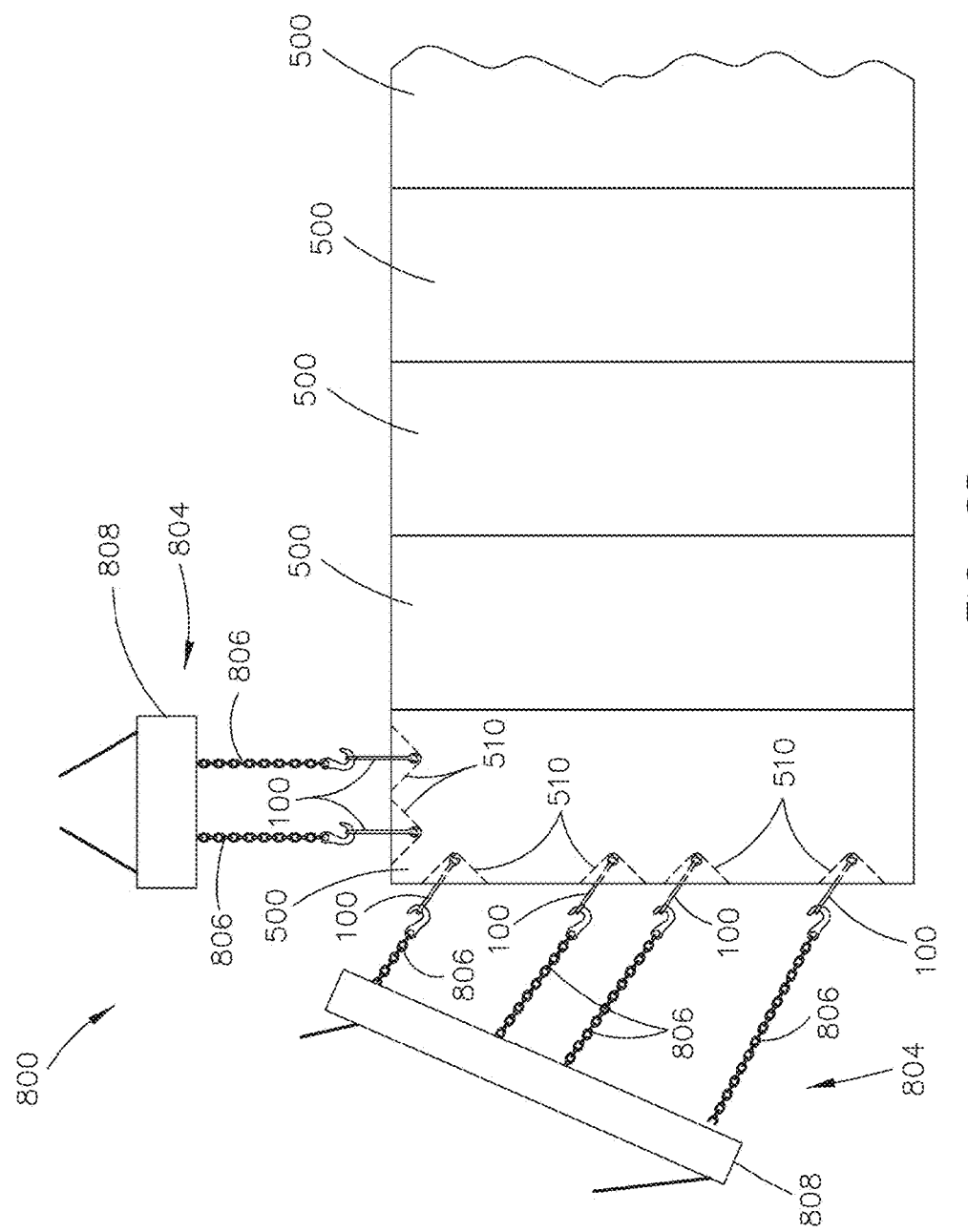

_US 10,287,785 B1_

REUSABLE LIFTING APPARATUS FOR INSULATED PRECAST CONCRETE SANDWICH PANELS

CROSS-REFERENCE TO RELATED APPLICATIONS

The present application claims the benefit under 35 U.S.C. § 119(e) of U.S. Provisional Patent Application Ser. No. 62/404,565, filed Oct. 5, 2016, entitled ZERO-ENERGY REUSABLE LIFTING DEVICE (ZELIFT) FOR PRECAST CONCRETE PANELS, naming Maher K. Tadros, Mark D. Lafferty, and Doug Gremel as inventors, which is incorporated herein by reference in the entirety.

TECHNICAL FIELD

The present invention generally relates to the field of insulated precast concrete sandwich panels and, more particularly, to a reusable lifting apparatus for insulated precast concrete sandwich panels that eliminates thermal bridging.

BACKGROUND

Precast concrete is a form of construction, where concrete layers are cast in a reusable mold, form, or pre-casting bed and then cured in a controlled environment. An insulated precast concrete sandwich panel (e.g., a double wall precast) may include two layers (e.g., wythes) of concrete sandwiched around an insulation layer with a high R-value (a measure of thermal resistance). Inserts currently available for lifting and/or positioning an insulated precast concrete sandwich panel, which typically cost over $100 per panel, are normally made of steel. The currently-available inserts are permanently fixed to the layers, making the inserts usable only once. Additionally, the currently-available inserts are placed across the insulation to lift the insulated precast concrete sandwich panel into place. As steel is thermally conductive, the permanently-fixed inserts create a thermal bridge between the precast concrete layers across the insulation, reducing the R-value of the insulated precast concrete sandwich panel.

Therefore, it would be advantageous to provide a system and method that cures the shortcomings described above.

SUMMARY

A reusable lifting apparatus for a concrete sandwich panel is disclosed, in accordance with one or more embodiments of the present disclosure. In one embodiment, the reusable lifting apparatus includes a first mount assembly embedded within a first layer of a concrete sandwich panel. In another embodiment, the reusable lifting apparatus includes a second mount assembly embedded within a second layer of the concrete sandwich panel. In another embodiment, the reusable lifting apparatus includes a lifting insert insertable within a void in one or more insulation layers between the first layer and the second layer of the concrete sandwich panel. In another embodiment, a portion of the lifting insert is alignable with the first mount assembly and the second mount assembly. In another embodiment, the reusable lifting apparatus includes a lifting bolt couplable to at least one of the first mount assembly, the second mount assembly, or the lifting insert through a hole in the first layer of the concrete sandwich panel. In another embodiment, the lifting insert is pivotable within the void about an axis through the lifting bolt. In another embodiment, the lifting insert and the lifting bolt are removable from the concrete sandwich panel so as to eliminate thermal bridging between the first layer and the second layer of the concrete sandwich panel via the lifting insert and the lifting bolt.

A system is disclosed, in accordance with one or more embodiments of the present disclosure. In one embodiment, the system includes a concrete sandwich panel. In another embodiment, the concrete sandwich panel includes a first concrete layer. In another embodiment, the concrete sandwich panel includes a second concrete layer. In another embodiment, the system includes one or more insulation layers located between the first layer and the second layer. In another embodiment, the one or more insulation layers include a void. In another embodiment, the system includes a reusable lifting apparatus. In another embodiment, the reusable lifting apparatus includes a first mount assembly embedded within the first layer of the concrete sandwich panel. In another embodiment, the reusable lifting apparatus includes a second mount assembly embedded within the second layer of the concrete sandwich panel. In another embodiment, the reusable lifting apparatus includes a lifting insert insertable within the void in the one or more insulation layers between the first layer and the second layer of the concrete sandwich panel. In another embodiment, a portion of the lifting insert is alignable with the first mount assembly and the second mount assembly. In another embodiment, the reusable lifting apparatus includes a lifting bolt couplable to at least one of the first mount assembly, the second mount assembly, or the lifting insert through a hole in the first layer of the concrete sandwich panel. In another embodiment, the lifting insert is pivotable within the void about an axis through the lifting bolt. In another embodiment, the lifting insert and the lifting bolt are removable from the concrete sandwich panel so as to eliminate thermal bridging between the first layer and the second layer of the concrete sandwich panel via the lifting insert and the lifting bolt.

BRIEF DESCRIPTION OF THE DRAWINGS

The numerous advantages of the disclosure may be better understood by those skilled in the art by reference to the accompanying figures in which:

FIG. 2D illustrates an isometric view of an alternative lifting insert of a reusable lifting apparatus for an insulated precast concrete sandwich panel, in accordance with one or more embodiments of the present disclosure;

FIG. 4A illustrates a partially-isometric view of a lifting bolt of a reusable lifting apparatus for an insulated precast concrete sandwich panel, in accordance with one or more embodiments of the present disclosure;

FIG. 4B illustrates a front cross-section view of a lifting bolt of a reusable lifting apparatus for an insulated precast concrete sandwich panel, in accordance with one or more embodiments of the present disclosure;

FIG. 5B illustrates a side cross-section view of a reusable lifting apparatus inserted in an insulated precast concrete sandwich panel, in accordance with one or more embodiments of the present disclosure;

FIG. 6A illustrates an exploded isometric view of a block out and a casting pin utilized during fabrication of an insulated precast concrete sandwich panel, in accordance with one or more embodiments of the present disclosure;

FIG. 7B illustrates an insulated precast concrete sandwich panel being tilted in a substantially upright position, in accordance with one or more embodiments of the present disclosure;

FIG. 8D illustrates an insulated precast concrete sandwich panel positioned via a set of reusable lifting apparatuses on a foundation, in accordance with one or more embodiments of the present disclosure;

DETAILED DESCRIPTION OF THE INVENTION

Reference will now be made in detail to the subject matter disclosed, which is illustrated in the accompanying drawings.

Referring generally to FIGS. 1A-10, a reusable lifting apparatus (ZeLift™) for insulated precast concrete sandwich panels is described, in accordance with the present disclosure.

Embodiments of the present disclosure are directed to a reusable lifting apparatus for an insulated precast concrete sandwich panel, where one or more of the components are insertable and/or removable from the panel and one or more components are embedded within one or more layers of the panel. Embodiments of the present disclosure are also directed to reusable fabrication components utilized during fabrication of the insulated precast concrete sandwich panel. Embodiments of the present disclosure are also directed to methods of lifting and/or positioning the insulated precast concrete sandwich panel via the reusable lifting apparatus. Embodiments of the present disclosure are also directed to preventing thermal transfer by removing one or more components of the reusable lifting apparatus from the insulated precast concrete sandwich panel following installation of the panel.

Although embodiments of the present disclosure are directed to an insulated precast concrete panel, it is noted herein the following embodiments may be directed to any concrete sandwich panel (e.g., insulated or not insulated; precast and/or field-cast). Therefore, the descriptions throughout the present disclosure should not be interpreted as a limitation but merely an illustration.

Figure 1A:
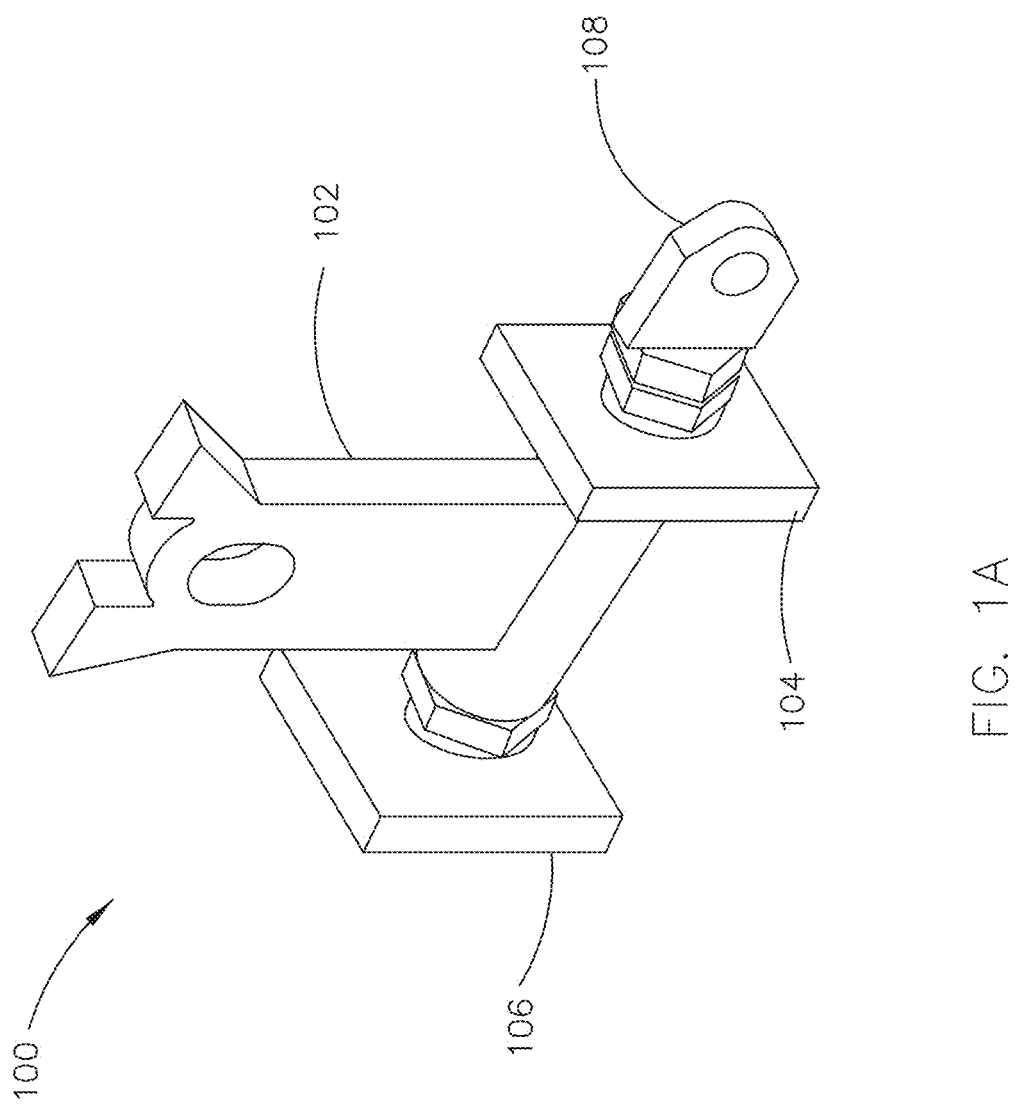
FIG. 1A illustrates an isometric view of a reusable lifting apparatus for an insulated precast concrete sandwich panel, in accordance with one or more embodiments of the present disclosure.
Figure 1B:
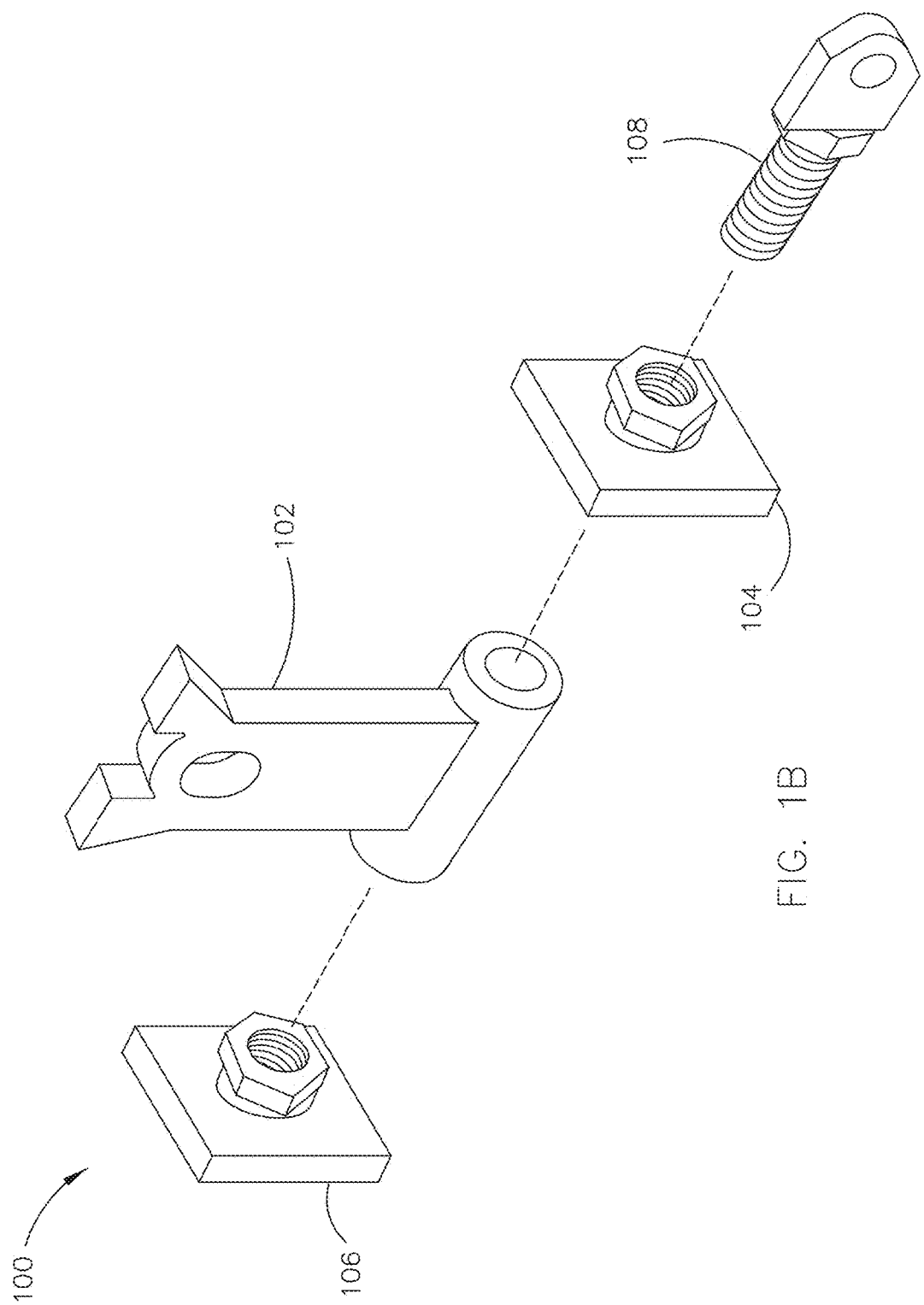
FIG. 1B illustrates an exploded isometric view of a reusable lifting apparatus for an insulated precast concrete sandwich panel, in accordance with one or more embodiments of the present disclosure.

FIGS. 1A and 1B generally illustrate a reusable lifting apparatus 100 for insulated precast concrete sandwich panels, in accordance with one or more embodiments of the present disclosure.

In one aspect, one or more components of the apparatus 100 are insertable within one or more layers of the insulated precast concrete sandwich panel prior to positioning of the panel and/or are removable following positioning of the panel. In this regard, the layers of the insulated precast concrete sandwich panel are coupled together only via thermally non-conductive systems following installation of the panel, such that thermal bridging across the insulation layer of the panel is reduced and/or eliminated. Additionally, in this regard, the one or more insertable and/or removable components of the apparatus 100 may be utilized to move subsequent insulated precast concrete sandwich panels, which may translate to saving significant sums of money when erecting structures using insulated precast concrete sandwich panels.

It is noted herein, however, that the apparatus 100 may be utilized with an insulated precast concrete sandwich panel coupled together via thermally conductive systems (e.g., tying members including metal rods, plates, or the like utilized to mechanically join an insulation layer to concrete layers of the panel). Therefore, the above description should not be interpreted as a limitation on the scope of the present disclosure but merely an illustration.

In one embodiment, the apparatus 100 includes a lifting insert 102. In another embodiment, the apparatus 100 includes an upper mount assembly 104. For example, the upper mount assembly 104 may be embedded within an upper layer of concrete laid second during fabrication of an insulated precast concrete sandwich panel. In another embodiment, the apparatus 100 includes a lower mount assembly 106. For example, the lower mount assembly 106 may be embedded within a lower layer of concrete laid first during fabrication of an insulated precast concrete sandwich panel. In another embodiment, the apparatus 100 includes a lifting bolt 108. In another embodiment, the apparatus 100 includes a selected tightness tolerance between the lifting insert 102, the upper mount assembly 104, and the lower mount assembly 106 when installed in an insulated precast concrete sandwich panel. For example, the selected tightness tolerance may prevent additional shearing forces from forming between the lifting insert 102, the upper mount assembly 104, and the lower mount assembly 106.

It is noted herein that the upper mount assembly 104 or the lower mount assembly 106 may be equivalent to a first mount assembly or a second mount assembly, for purposes of the present disclosure.

In another embodiment, the lifting insert 102 is insertable in and/or removable from between the upper mount assembly 104 and/or the lower mount assembly 106 embedded within respective layers of the insulated precast concrete sandwich panel. In another embodiment, the lifting bolt 108 is insertable in and/or removable from the upper mount assembly 104, the lifting insert 102, and/or the lower mount assembly 106. In another embodiment, the lifting insert 102 is pivotable and/or rotatable within a void of one or more insulated layers about an axis through the lifting bolt 108.

In another embodiment, the lifting bolt 108 passes through the upper mount assembly 104, the lifting insert 102, and/or the lower mount assembly 106. For example, the lifting bolt 108 may pass through the upper mount assembly 104 and the lifting insert 102, but only pass partway through the lower mount assembly 106. For instance, the lifting bolt 108 may only pass partway through the lower mount assembly 106, such that an exterior surface of the lower layer of the insulated precast concrete sandwich panel housing the lower mount assembly 106 is substantially smooth. By way of another example, the lifting bolt 108 may pass through the upper mount assembly 104, the lifting insert 102, and the entirety of the lower mount assembly 106, either into the lower layer or through the exterior surface of the lower layer of the insulated precast concrete sandwich panel.

It is noted herein the apparatus 100 may be rated for a selected lifting capacity, where the lifting capacity is dependent on the metal from which the apparatus 100 is fabricated. For example, the apparatus 100 may be rated for a 10-ton lifting capacity. By way of another example, where the metal used to fabricate the apparatus 100 is of an increased steel grade, the apparatus 100 may be rated for a 15-ton lifting capacity. In this regard, the lifting capacity of the apparatus 100 may be greater than any concrete panel lifting device currently known in the art.

FIGS. 2A-2D generally illustrate the lifting insert 102 of the reusable lifting apparatus 100, in accordance with one or more embodiments of the present disclosure.

In one embodiment, the lifting insert 102 includes a head 200. In another embodiment, the lifting insert 102 includes a body 210. In another embodiment, the lifting insert 102 includes a tube 220. In another embodiment, the head 200 and the body 210 are one formed component (e.g., formed via casting, forging, stamping, extruding, or the like), while the tube 220 is welded onto the body 210. For example, the tube 220 may be welded onto the body 210 with a fillet 230 ranging from 0.5 inches to 1 inch. For instance, the tube 220 may be welded onto the body with a 0.75-inch fillet 230. By way of another example, the tube 220 may be welded onto the body 210 via a penetration weld with a tensile strength of 80,000 lbs. In another embodiment, the head 200, the body 210, and the tube 220 are one formed component (e.g., formed via casting, forging, stamping, extruding, or the like).

In another embodiment, the lifting insert 102 is a selected length 202. For example, the selected length 202 may be dependent on an amount the lifting insert 102 should protrude from a surface of an insulated precast concrete sandwich panel. By way of another example, the selected length 202 may be dependent on an amount the lifting insert 102 should be inserted into the insulated precast concrete sandwich panel. By way of another example, the selected length 202 may range from 7 inches to 20 inches. For instance, the selected length 202 may be 9.5 inches. Additionally, the selected length 202 may be 16 inches.

In another embodiment, the head 200 includes a hole 204. For example, the hole 204 may be centered within the head 200 in one or more directions. By way of another example, the hole 204 may not be centered within the head 200 in any direction. The hole 204 may include any cross-section known in the art including, but not limited to, a circular, elliptic, triangular, rectangular cross-section, or the like. For example, where the hole 204 is elliptic, a short diameter of the hole 204 may range from 0.5 to 1.5 inches. For instance, where the hole 204 is elliptic, the short diameter of the hole 204 may be 1 inch. In another embodiment, the hole 204 is couplable to a lifting assistance component. For example, the hole 204 may be couplable to a rope, a chain, a strap, a hook, or the like. It is noted herein that at least a portion of the hole 204 may extend into the body 210. In another embodiment, the apparatus 100 is usable to lift and/or position an insulated precast concrete sandwich panel via the hole 204, as described in detail further herein.

In another embodiment, the head 200 includes a top edge 206. For example, the top edge 206 may complement the hole 204 (e.g., a rounded top edge 206 mapping to a circular cross-section hole 204). By way of another example, the top edge 206 may be independent of the hole 204 (e.g., a rectangular top edge 206 versus a circular cross-section hole 204). In another embodiment, the head 200 includes one or more protrusions 208 extending from the top edge 206. It is noted herein the shape of the head 200 may substantially map to any precast concrete panel lifting component known in the art.

In another embodiment, the lifting insert 102 includes a top surface 212 and a bottom surface 214. For example, the hole 204 may pass through the top surface 212 and the bottom surface 214. In another embodiment, the lifting insert 102 is a selected width 216. For example, the head 200 and the body 210 may be the selected width 216. By way of another example, the head 200 may include one or more protrusions 208, where the one or more protrusions 208 extend outside the selected width 216. By way of another example, the selected width 216 may range from 2 to 6 inches. For instance, the selected width 216 may be 3.5 inches. In another embodiment, the lifting insert 102 is a selected thickness 218. For example, the selected thickness 218 may range from 0.25 to 1.5 inches. For instance, the selected thickness 218 may be 0.75 inches. It is noted herein the head 200 and the body 210 may be substantially similar or different selected widths 216 and/or substantially similar or different selected thicknesses 218.

In another embodiment, the tube 220 is a selected diameter 222. For example, the selected diameter may be substantially similar to or different from the selected thickness 216. By way of another example, the selected diameter 222 may range from 1 inch to 4 inches. For instance, the selected diameter 222 may be 2.5 inches. In another embodiment, a hole 224 with a selected diameter 226 passes through the tube 220. For example, the selected diameter 226 may be dependent on a diameter of the lifting bolt 108 to be inserted within the tube 220. For instance, the selected diameter 226 may be 1/16 of an inch larger than the diameter of the lifting bolt 108 to be inserted within the tube 220. By way of another example, the selected diameter 226 may range from 1 to 4 inches. For instance, the selected diameter 226 may be 1 9/16 inch (e.g., for a 1.5-inch lifting bolt 108).

In another embodiment, the hole 224 is threaded, where the threading substantially matches with the thread of the lifting bolt 108. In another embodiment, where the hole 224 is threaded, the hole 224 is threaded to align with threaded portions of the upper mount assembly 104 and/or the lower mount assembly 106, as described in detail further herein.

In another embodiment, the hole 224 and the hole 204 pass through substantially perpendicular planes of the lifting insert 102. In another embodiment, the hole 224 and the hole 204 pass through substantially parallel planes of the lifting insert 102.

In another embodiment, the tube 220 is a selected width 228. For example, the selected width 228 may be substantially similar to or different from the selected width 216. By way of another example, the selected width 228 of the tube 220 may be dependent on the insulation gap between concrete layers of an insulated precast concrete sandwich panel. For instance, the selected width 228 may be 3.75 inches, where the insulation gap between the concrete layers is 4 inches wide. Additionally, the selected width 228 may be 4.75 inches, where the insulation gap between the concrete layers is 5 inches wide. Further, the selected width 228 may be 5.75 inches, where the insulation gap between the concrete layers is 6 inches wide.

Figure 2A:
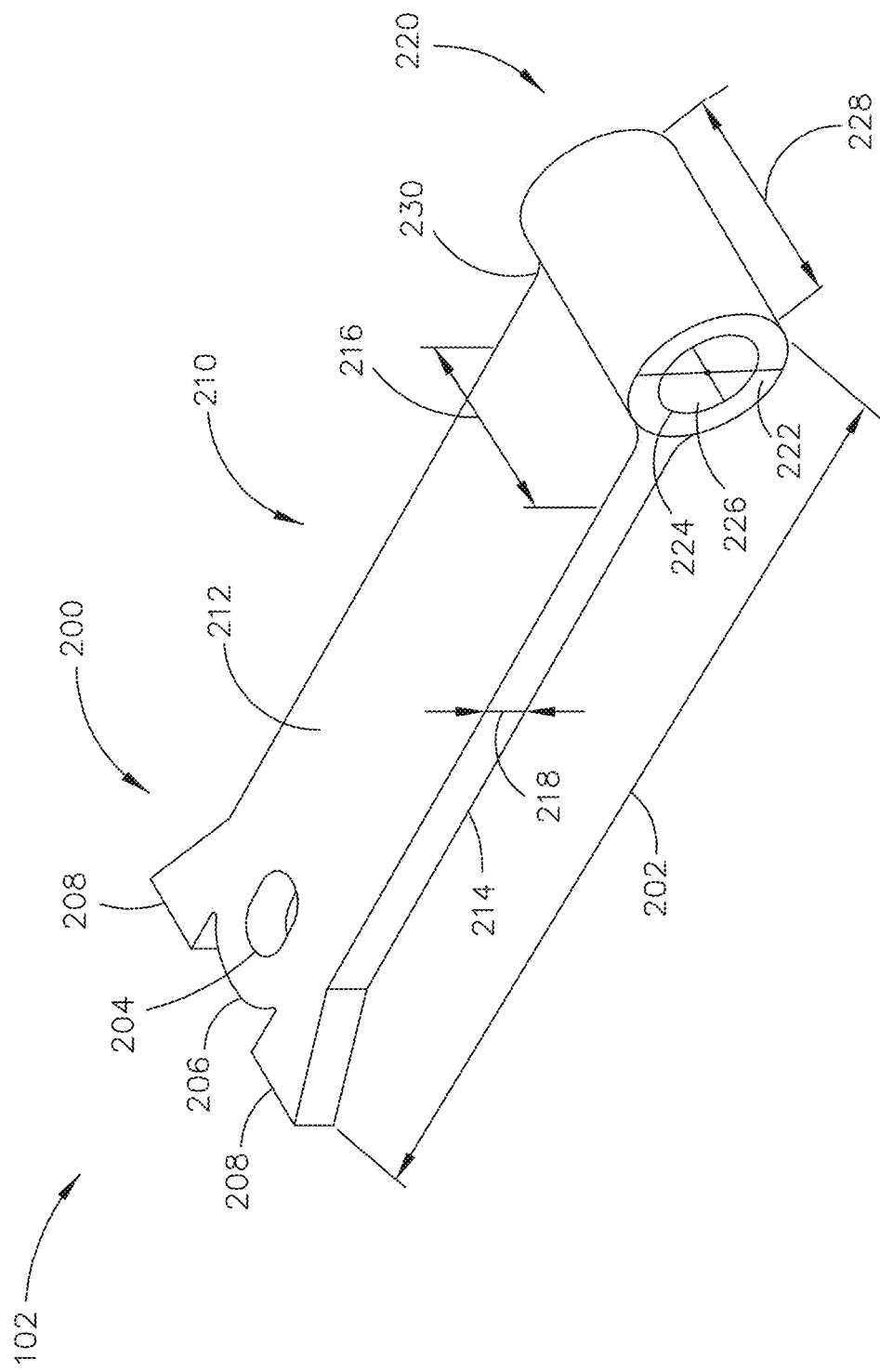
FIG. 2A illustrates an isometric view of a lifting insert of a reusable lifting apparatus for an insulated precast concrete sandwich panel, in accordance with one or more embodiments of the present disclosure.

FIG. 2D illustrates an alternative version of the lifting insert 102, in accordance with one or more embodiments of the present disclosure. It is noted herein that the embodiments directed to the illustrations in FIGS. 2A-2C may additionally be directed to the illustrations in FIG. 2D.

In one embodiment, the lifting insert 102 includes one or more bearing plates 240. For example, the one or more bearing plates 240 may be affixed to the one or more protrusions 208 of the head 200 and/or affixed to the body 210. By way of another example, the one or more bearing plates 240 may be configured to set on a surface of an insulated precast concrete sandwich panel (e.g., the surface through which the lifting insert 102 is inserted and/or removed). For instance, setting the one or more bearing plates 240 on the surface of the insulated precast concrete sandwich panel may increase the lateral shearing capacity of the lifting insert 102 (e.g., increase the lateral shearing capacity of the apparatus 100).

Figure 2B:
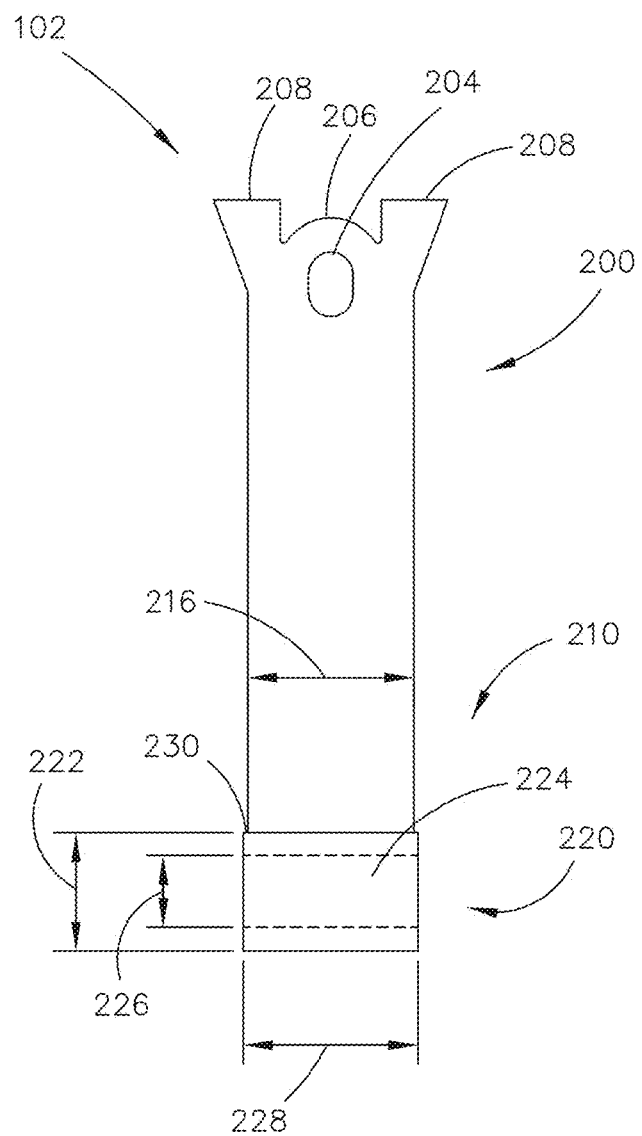
FIG. 2B illustrates a front view of a lifting insert of a reusable lifting apparatus for an insulated precast concrete sandwich panel, in accordance with one or more embodiments of the present disclosure.
Figure 2C:
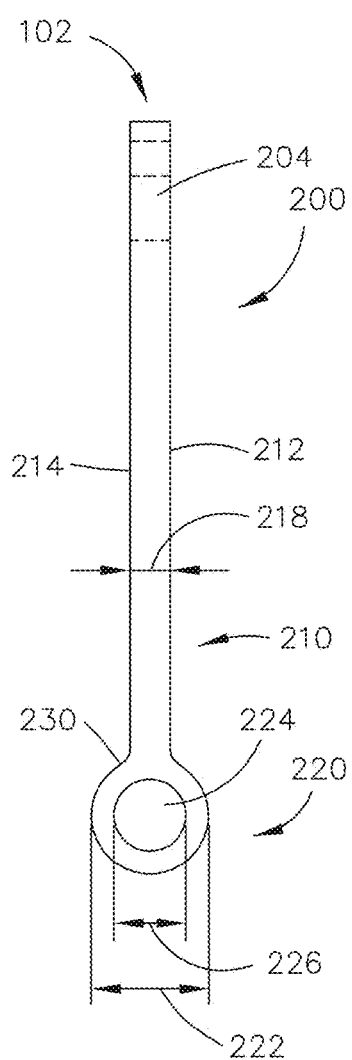
FIG. 2C illustrates a side view of a lifting insert of a reusable lifting apparatus for an insulated precast concrete sandwich panel, in accordance with one or more embodiments of the present disclosure.

It is noted herein the lifting insert 102 as illustrated in FIGS. 2A-2C may be usable on a factory floor and/or on-site. It is additionally noted herein the lifting insert 102 as illustrated in FIG. 2D may be usable on a factory floor.

FIGS. 3A-3J generally illustrate the upper mount assembly 104 and lower mount assembly 106 of the reusable lifting apparatus 100, in accordance with one or more embodiments of the present disclosure.

Figure 3A:
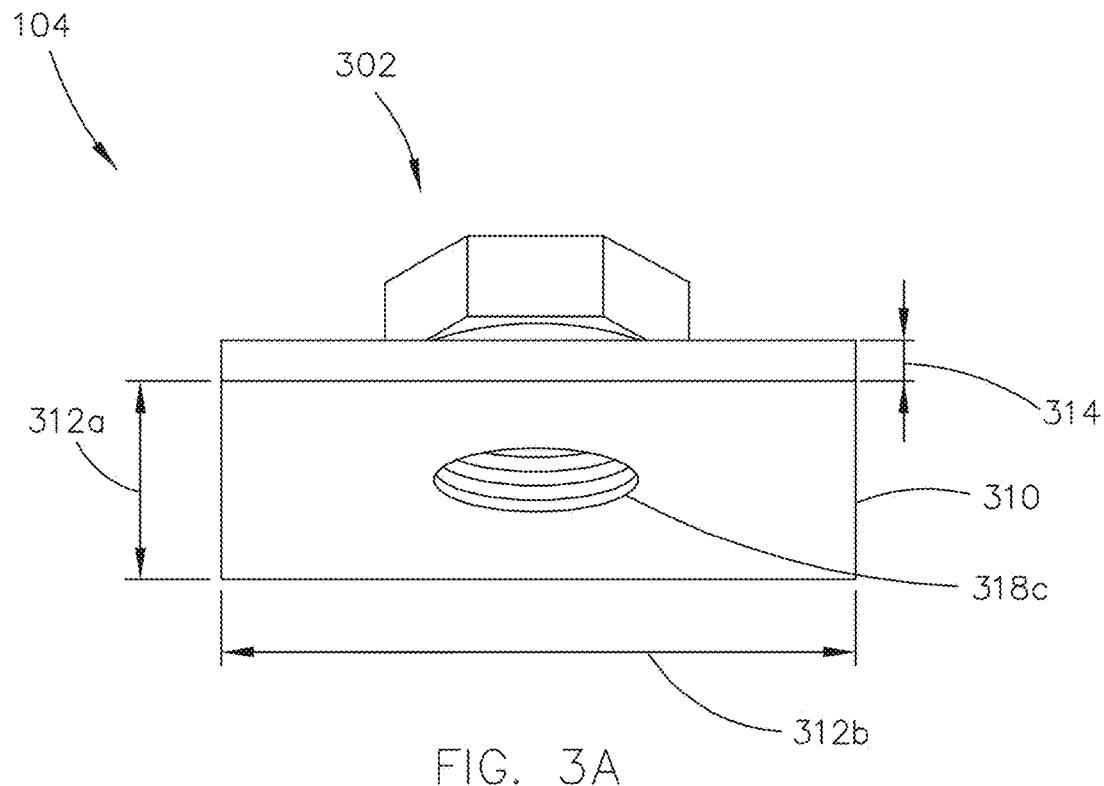
FIG. 3A illustrates a partially-isometric view of an upper mount assembly of a reusable lifting apparatus for an insulated precast concrete sandwich panel, in accordance with one or more embodiments of the present disclosure.
Figure 3B:
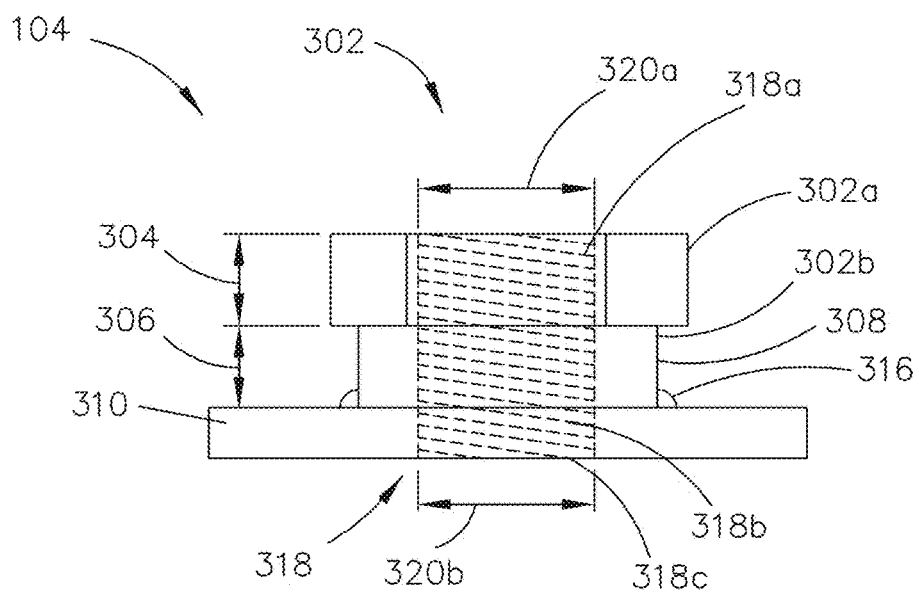
FIG. 3B illustrates a front cross-section view of an upper mount assembly of a reusable lifting apparatus for an insulated precast concrete sandwich panel, in accordance with one or more embodiments of the present disclosure.

Referring now to FIGS. 3A and 3B, in one embodiment the upper mount assembly 104 includes a nut 302. In another embodiment, the nut 302 includes an unmachined portion 302a with a selected height 304. In another embodiment, the nut 302 includes a machined (e.g., rounded) portion 302b with a selected height 306 and a selected radius 308. The selected height 304 and the selected height 306 may be substantially similar or different. For example, the selected height 304 may range from 0.25 to 1.5 inches. For instance, the selected height 304 may be 0.75 inches. By way of another example, the selected height 306 may range from 0.25 to 1.5 inches. For instance, the selected height 306 may be 0.75 inches. By way of another example, the combined selected heights 304, 306 may range from 0.5 to 3 inches. For instance, the combined selected heights 304, 306 may be 1.5 inches. It is noted herein the unmachined portion 302a and a machined portion 302b may provide a ledge for increased prevention of the upper mount assembly 104 pulling out of an upper layer of the insulated precast concrete sandwich panel. It is additionally noted herein the machined portion 302b may provide a more suitable weld surface, as described in detail further herein. It is additionally noted herein the nut 302 may include only an unmachined portion 302a or a machined portion 302b. Therefore, the above description should not be interpreted as a limitation on the scope of the present disclosure but merely an illustration.

In another embodiment, the upper mount assembly 104 includes a plate 310. In another embodiment, the plate 310 is a selected width 312a, a selected depth 312b, and a selected thickness 314. The selected width 312a and the selected depth 312b may be substantially similar or different. For example, the selected width 312a and/or the selected depth 312b may range from 2 to 10 inches. For instance, the selected width 312a and/or the selected depth 312b may be 5 inches. By way of another example, the selected thickness 314 may range from 0.25 to 0.75 inches. For instance, the selected thickness 314 may be 0.375 inches. By way of another example, the combined height/thickness of the upper mount assembly 104 may range from 0.75 to 3.75 inches. For instance, the combined height/thickness of the upper mount assembly 104 may be 1.875 inches.

In another embodiment, the nut 302 is welded onto the plate 310. For example, the machined portion 302b of the nut 302 may be welded onto the plate 310. By way of another example, the nut 302 may be welded onto the plate 310 with a fillet 316 ranging from 0.125 inches to 0.5 inch. For instance, the nut 302 may be welded onto the plate 310 with a 0.25-inch fillet 316. In another embodiment, the nut 302 and the plate 310 are one formed component (e.g., formed via casting, forging, stamping, extruding, or the like).

In another embodiment, the upper mount assembly 104 includes a hole 318. In another embodiment, the hole 318 includes a portion 318a through the nut 302 and a portion 318b through the plate 310. For example, a diameter 320a of the portion 318a may be substantially similar or different to a diameter 320b of the portion 318b. By way of another example, the diameter 320a of the portion 318a and/or the diameter 320b of the portion 318b may be dependent on the diameter of the lifting bolt 108. By way of another example, the diameter 320a of the portion 318a and/or the diameter 320b of the portion 318b may range from 1 inch to 2.5 inches. For instance, the diameter 320a of the portion 318a and/or the diameter 320b of the portion 318b may be 1.5 inches.

In another embodiment, the hole 318 accepts a lifting bolt 108. For example, the lifting bolt 108 may enter the hole 318 through the nut 302. By way of another example, the lifting bolt 108 may exit the hole 318 through the plate 310 via an opening 318c.

In another embodiment, the hole 318 is substantially smooth. In another embodiment, the hole 318 is threaded, where the threading substantially matches with the thread of the lifting bolt 108. For example, a portion of the hole 318 may be threaded. For instance, the portion 318a of the hole 318 (e.g., through the nut 302) may be threaded, and the portion 318b of the hole 318 (e.g., through the plate 310) may be substantially smooth. By way of another example, the entirety of the hole 318 may be threaded. For instance, the portion 318a of the hole 318 (e.g., through the nut 302) may be threaded, and the portion 318b of the hole 318 (e.g., through the plate 310) may be threaded to align with the threaded portion 318a. It is noted herein that leaving all or a portion of the hole 318 substantially smooth may accelerate the installation of the lifting rod 108.

Figure 3C:
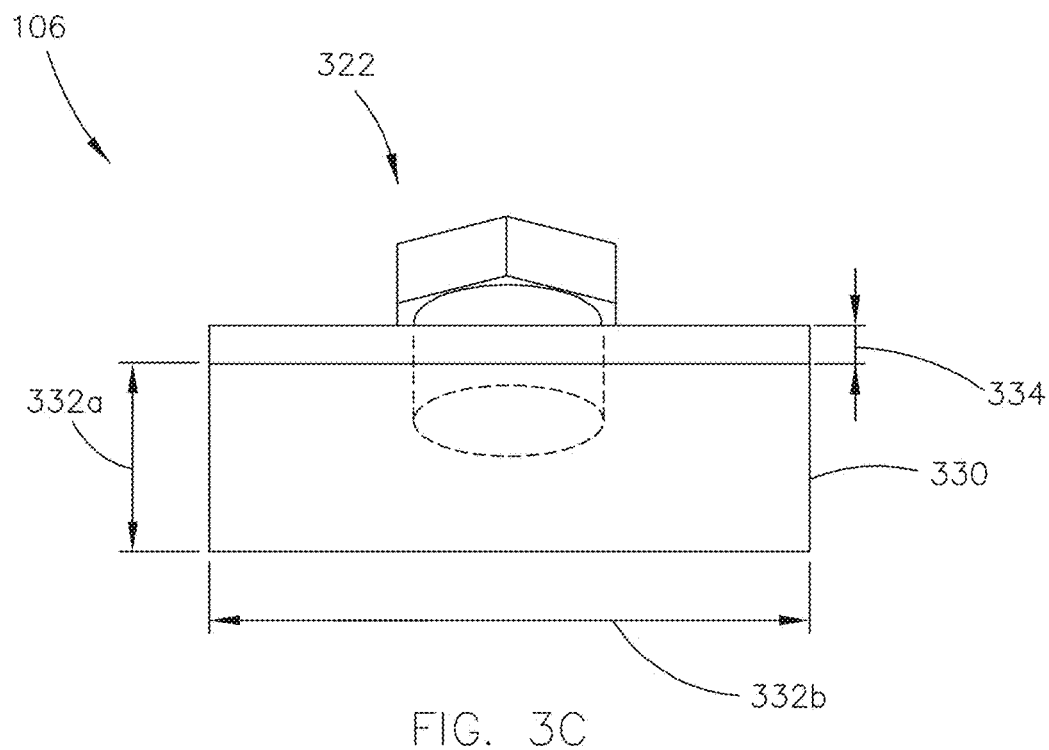
FIG. 3C illustrates a partially-isometric view of a lower mount assembly of a reusable lifting apparatus for an insulated precast concrete sandwich panel, in accordance with one or more embodiments of the present disclosure.
Figure 3D:
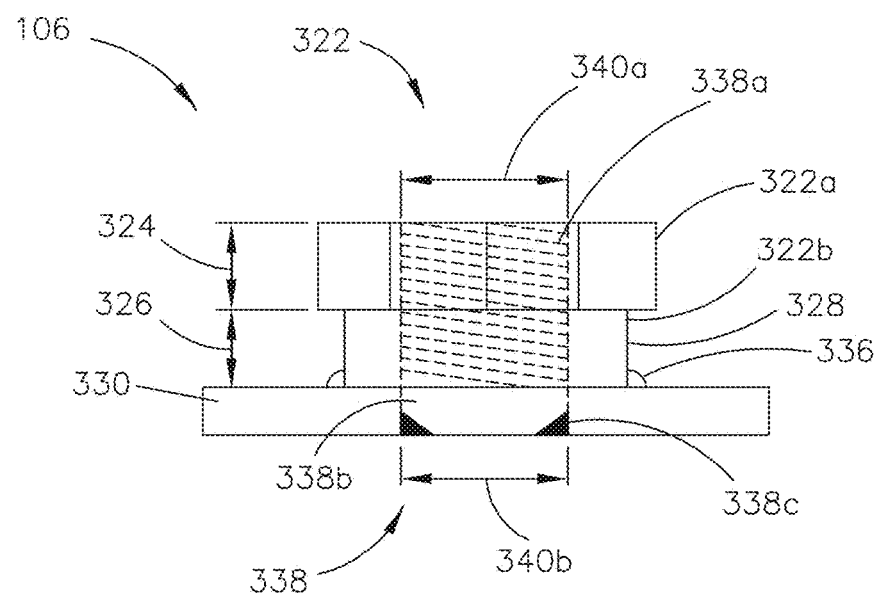
FIG. 3D illustrates a front cross-section view of a lower mount assembly of a reusable lifting apparatus for an insulated precast concrete sandwich panel, in accordance with one or more embodiments of the present disclosure.

Referring now to FIGS. 3C and 3D, in one embodiment the lower mount assembly 106 includes a nut 322. In another embodiment, the nut 322 includes an unmachined portion 322a with a selected height 324. In another embodiment, the nut 322 includes a machined (e.g., rounded) portion 322b with a selected height 326 and a selected radius 328. The selected height 324 and the selected height 326 may be substantially similar or different. For example, the selected height 324 may range from 0.25 to 1.5 inches. For instance, the selected height 324 may be 0.75 inches. By way of another example, the selected height 326 may range from 0.25 to 1.5 inches. For instance, the selected height 326 may be 0.75 inches. By way of another example, the combined selected heights 324, 326 may range from 0.5 to 3 inches. For instance, the combined selected heights 324, 326 may be 1.5 inches. It is noted herein the nut 322 including an unmachined portion 322a and a machined portion 322b may provide a ledge to prevent against the lower mount assembly 106 pulling out of a lower layer of the insulated precast concrete sandwich panel. It is additionally noted herein the machined portion 322b may provide a more suitable weld surface, as described in detail further herein. It is additionally noted herein the nut 322 may include only an unmachined portion 322a or a machined portion 322b. Therefore, the above description should not be interpreted as a limitation on the scope of the present disclosure but merely an illustration.

In another embodiment, the lower mount assembly 106 includes a plate 330. In another embodiment, the plate 330 is a selected width 332a, a selected depth 332b, and a selected thickness 334. The selected width 332a and the selected depth 332b may be substantially similar or different. For example, the selected width 332a and/or the selected depth 332b may range from 2 to 10 inches. For instance, the selected width 332a and/or the selected depth 332b may be 5 inches. By way of another example, the selected thickness 334 may range from 0.25 to 0.75 inches. For instance, the selected thickness 334 may be 0.375 inches. By way of another example, the combined height/thickness of the lower mount assembly 106 may range from 0.75 to 3.75 inches. For instance, the combined height/thickness of the lower mount assembly 106 may be 1.875 inches.

In another embodiment, the nut 322 is welded onto the plate 330. For example, the machined portion 322b of the nut 322 may be welded onto the plate 330. By way of another example, the nut 322 may be welded onto the plate 330 with a fillet 336 ranging from 0.125 inches to 0.5 inch. For instance, the nut 322 may be welded onto the plate 330 with a 0.25-inch fillet 336. In another embodiment, the nut 322 and the plate 330 are one formed component (e.g., formed via casting, forging, stamping, extruding, or the like).

In another embodiment, the lower mount assembly 106 includes a hole 338. In another embodiment, the hole 338 includes a portion 338a through the nut 322 and a portion 338b through the plate 330. For example, a diameter 340a of the portion 338a may be substantially similar or different to a diameter 340b of the portion 338b. By way of another example, the diameter 340a of the portion 338a and/or the diameter 340b of the portion 338b may be dependent on the diameter of the lifting bolt 108. By way of another example, the diameter 340a of the portion 338a and/or the diameter 340b of the portion 338b may range from 1 inch to 2.5 inches. For instance, the diameter 340a of the portion 338a and/or the diameter 340b of the portion 338b may be 1.5 inches.

In another embodiment, the hole 338 accepts a lifting bolt 108. For example, the lifting bolt 108 may enter the hole 338 through the nut 322. By way of another example, the lifting bolt 108 may not exit the plate 330. For instance, the plate 330 may not include an opening (e.g., an opening 318c in plate 310). Additionally, the plate 330 may include a bolt stop 338c within the hole 338.

In another embodiment, the hole 338 is threaded, where the threading substantially matches with the thread of the lifting bolt 108. For example, a portion of the hole 338 may be threaded. For instance, the portion 338a of the hole 338 (e.g., through the nut 322) may be threaded, and the portion 338b of the hole 338 (e.g., through the plate 330) may be substantially smooth. By way of another example, the entirety of the hole 338 may be threaded. For instance, the portion 338a of the hole 338 (e.g., through the nut 322) may be threaded, and the portion 338b of the hole 338 (e.g., through the plate 330) may be threaded to align with the threaded portion 338a. It is noted herein that leaving a portion of the hole 338 substantially smooth may accelerate the installation of the lifting bolt 108.

In another embodiment, where the hole 318 and the hole 338 are threaded, the hole 318 is threaded to align with the threads of the hole 338.

Figure 3E:
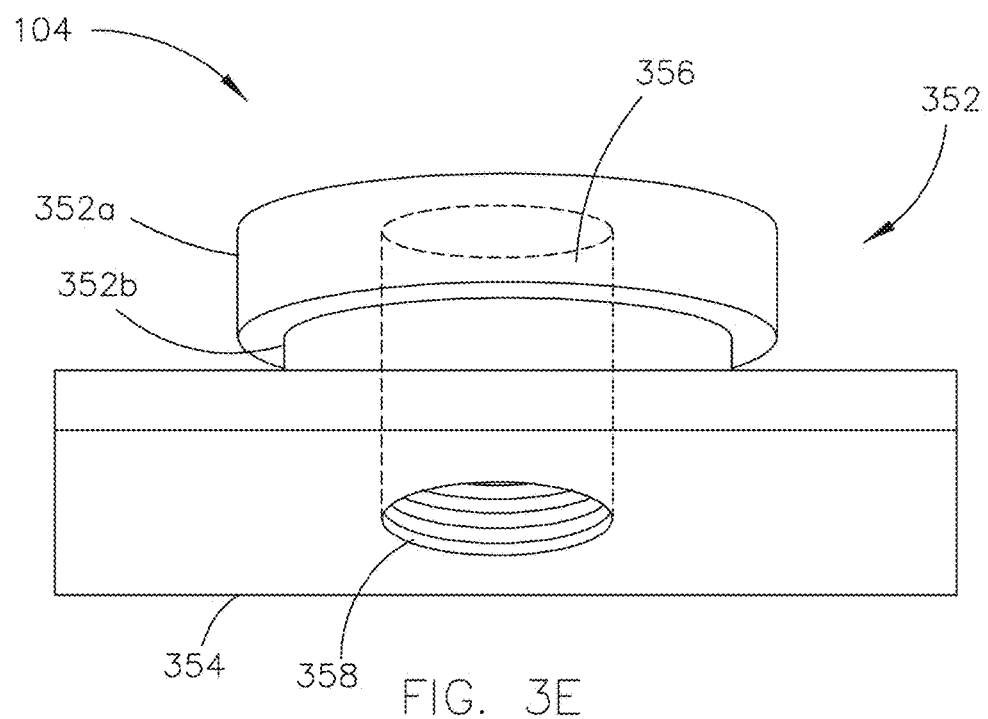
FIG. 3E illustrates a partially-isometric view of a casted upper mount of a reusable lifting apparatus for an insulated precast concrete sandwich panel, in accordance with one or more embodiments of the present disclosure.
Figure 3F:
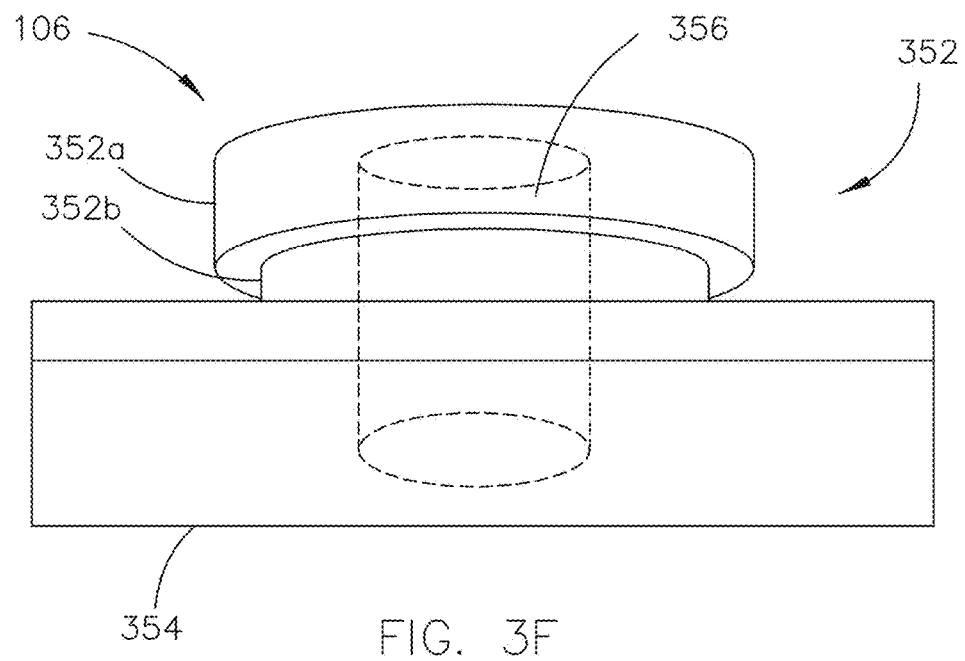
FIG. 3F illustrates a partially-isometric view of a casted lower mount of a reusable lifting apparatus for an insulated precast concrete sandwich panel, in accordance with one or more embodiments of the present disclosure.

Referring now to FIGS. 3E and 3F, an alternative version of the upper mount assembly 104 and the lower mount assembly 106 is illustrated, in accordance with one or more embodiments of the present disclosure. It is noted herein that the embodiments directed to the illustrations in FIGS. 3A-3D may additionally be directed to the illustrations in FIGS. 3E and 3F.

In one embodiment, the upper mount assembly 104 and the lower mount assembly 106 include a barrel 352 and a plate 354. For example, the barrel 352 may include a first portion 352a and a second portion 352b. For instance, the first portion 352a may be a diameter that is larger or smaller than a diameter of the second portion 352b. In another embodiment, the barrel 352 and the plate 354 are one formed component (e.g., formed via casting, forging, stamping, extruding, or the like).

In another embodiment, the upper mount assembly 104 and the lower mount assembly 106 include a hole 356. In another embodiment, the hole 356 accepts a lifting bolt 108. For example, the lifting bolt 108 may enter the hole 356 through the barrel 352. By way of another example, as illustrated in FIG. 3E, the lifting bolt 108 may exit the upper mount assembly 104 through an opening 358 in the plate 354. By way of another example, the lifting bolt 108 may not exit the plate 354. For instance, as illustrated in FIG. 3F, the plate 354 may not include an opening. By way of another example, the plate 354 may include a bolt stop within the hole 356.

In another embodiment, the hole 356 of the upper mount assembly 104 is substantially smooth. In another embodiment, the hole 356 of the upper mount assembly 104 and/or the lower mount assembly 106 is threaded, where the threading substantially matches with the thread of the lifting bolt 108. For example, a portion of the hole 356 may be threaded. For instance, the portion of the hole 356 (e.g., through the barrel 352) may be threaded, and the portion of the hole 356 (e.g., through the plate 354) may be substantially smooth. By way of another example, the entirety of the hole 356 may be threaded. For instance, the portion of the hole 356 (e.g., through the barrel 352) may be threaded, and the portion of the hole 356 (e.g., through the plate 354) may be threaded to align with the threaded portion through the barrel 352. It is noted herein that leaving a portion of the hole 356 substantially smooth may accelerate the installation of the lifting bolt 108.

In another embodiment, where the hole 356 of the upper mount assembly 104 and the hole 356 of the lower mount assembly 106 are threaded, the hole 356 of the upper mount assembly 104 is threaded to align with the threads of the hole 356 of the lower mount assembly 106.

Figure 3G:
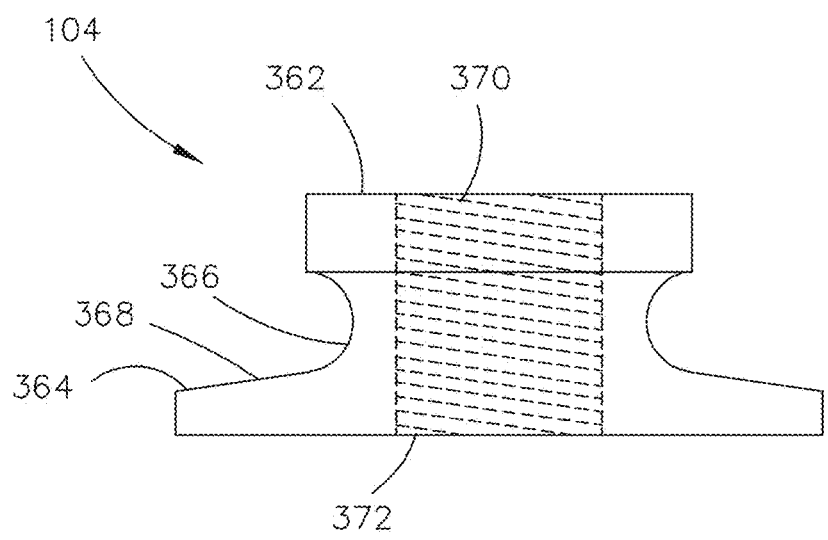
FIG. 3G illustrates a partially-isometric view of an alternative casted upper mount of a reusable lifting apparatus for an insulated precast concrete sandwich panel, in accordance with one or more embodiments of the present disclosure.
Figure 3H:
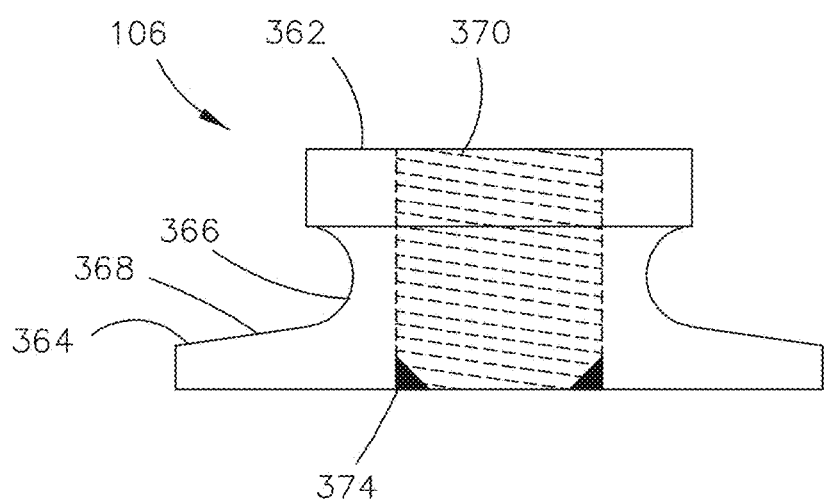
FIG. 3H illustrates a partially-isometric view of an alternative lower mount of a reusable lifting apparatus for an insulated precast concrete sandwich panel, in accordance with one or more embodiments of the present disclosure.

Referring now to FIGS. 3G and 3H, an alternative version of the upper mount assembly 104 and the lower mount assembly 106 is illustrated, in accordance with one or more embodiments of the present disclosure. It is noted herein that the embodiments directed to the illustrations in FIGS. 3A-3F may additionally be directed to the illustrations in FIGS. 3G and 3H.

In one embodiment, the upper mount assembly 104 and the lower mount assembly 106 include a barrel 362 and a plate 364. In another embodiment, the barrel 362 and the plate 364 are one formed component (e.g., formed via casting, forging, stamping, extruding, or the like). In another embodiment, the upper surface 368 of the plate 364 (e.g., the surface of the plate 364 coupled to the fillet 366) may be sloped. For example, the ratio of the sloped surface 368 may range from 1:4 to 1:16. For instance, the ratio of the sloped surface 368 may be 1:8. In another embodiment, the barrel 362 and the sloped surface 368 of the plate 364 are coupled together via a fillet 366. For example, a radius of the fillet 366 may range from 0.125 to 0.75 inches. For instance, the radius of the fillet 366 may be 0.375 inches.

In another embodiment, the upper mount assembly 104 and the lower mount assembly 106 include a hole 370. In another embodiment, the hole 370 accepts a lifting bolt 108. For example, the lifting bolt 108 may enter the hole 370 through the nut 362. By way of another example, as illustrated in FIG. 3G, the lifting bolt 108 may exit the upper mount assembly 104 through an opening 372 in the plate 364. By way of another example, the lifting bolt 108 may not exit the plate 364. For instance, as illustrated in FIG. 3H, the plate 364 may include a bolt stop 374 within the hole 370.

In another embodiment, the hole 370 of the upper mount assembly 104 is substantially smooth. In another embodiment, the hole 370 of the upper mount assembly 104 and/or the lower mount assembly 106 is threaded, where the threading substantially matches with the thread of the lifting bolt 108. For example, a portion of the hole 370 may be threaded. For instance, the portion of the hole 370 (e.g., through the barrel 362) may be threaded, and the portion of the hole 370 (e.g., through the plate 364) may be substantially smooth. By way of another example, the entirety of the hole 370 may be threaded. For instance, the portion of the hole 370 (e.g., through the barrel 362) may be threaded, and the portion of the hole 370 (e.g., through the plate 364) may be threaded to align with the threaded portion through the barrel 362. It is noted herein that leaving a portion of the hole 370 substantially smooth may accelerate the installation of the lifting bolt 108.

In another embodiment, where the hole 370 of the upper mount assembly 104 and the hole 370 of the lower mount assembly 106 are threaded, the hole 370 of the upper mount assembly 104 is threaded to align with the threads of the hole 370 of the lower mount assembly 106.

Figure 3I:
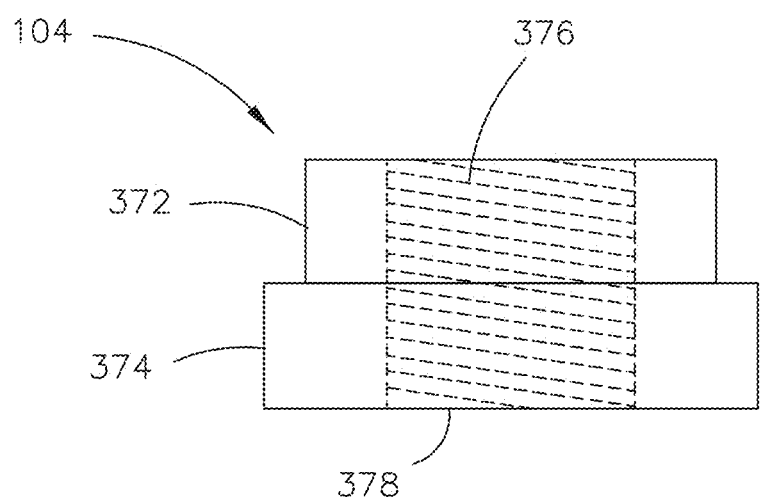
FIG. 3I illustrates a partially-isometric view of a casted upper nut of a reusable lifting apparatus for an insulated precast concrete sandwich panel, in accordance with one or more embodiments of the present disclosure.
Figure 3J:
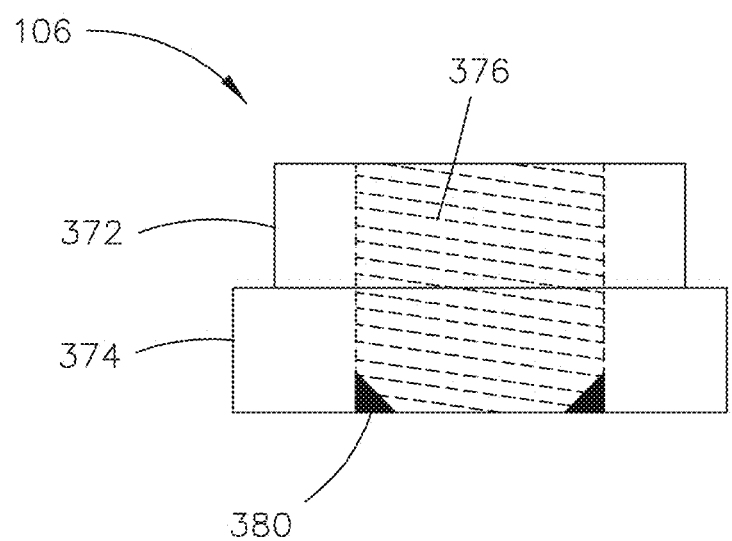
FIG. 3J illustrates a partially-isometric view of a casted lower nut of a reusable lifting apparatus for an insulated precast concrete sandwich panel, in accordance with one or more embodiments of the present disclosure.
Figure 4C:
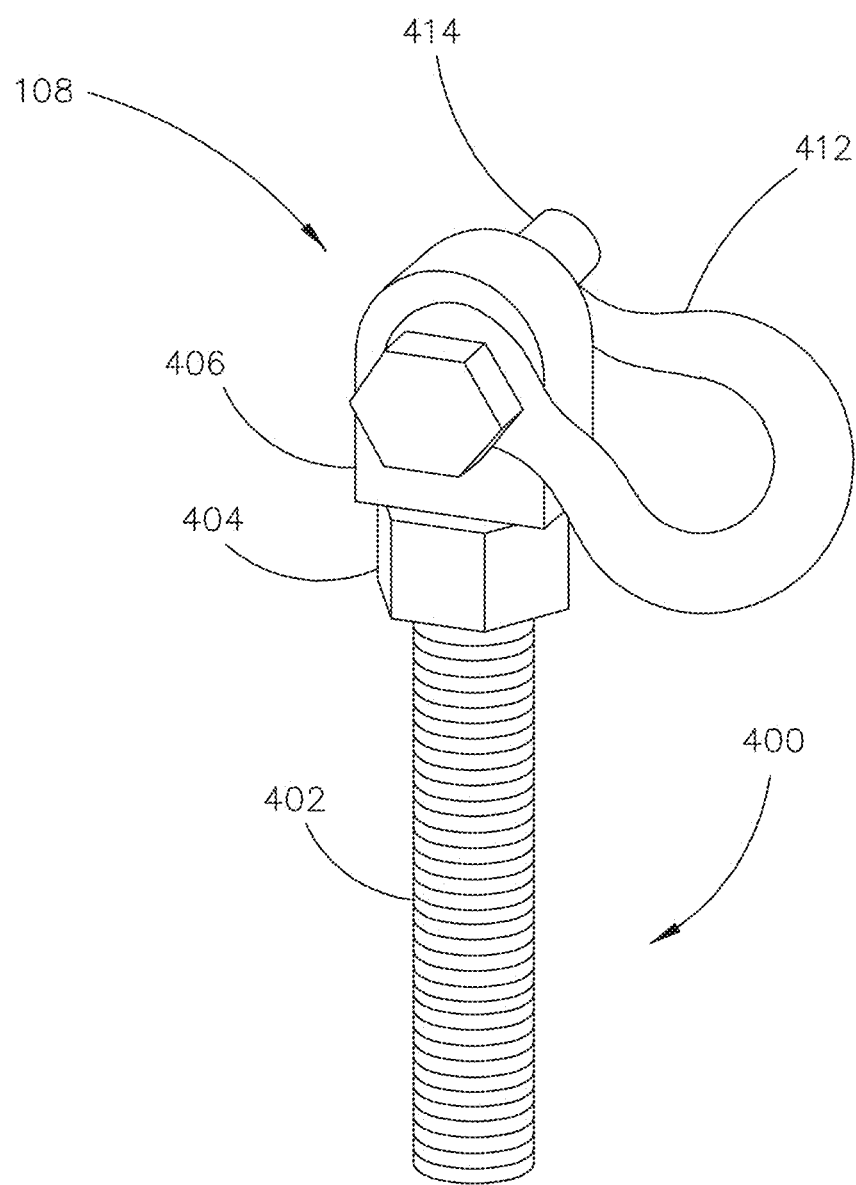
FIG. 4C illustrates a partially-isometric view of a lifting bolt and T-shackle of a reusable lifting apparatus for an insulated precast concrete sandwich panel, in accordance with one or more embodiments of the present disclosure.
Figure 5A:
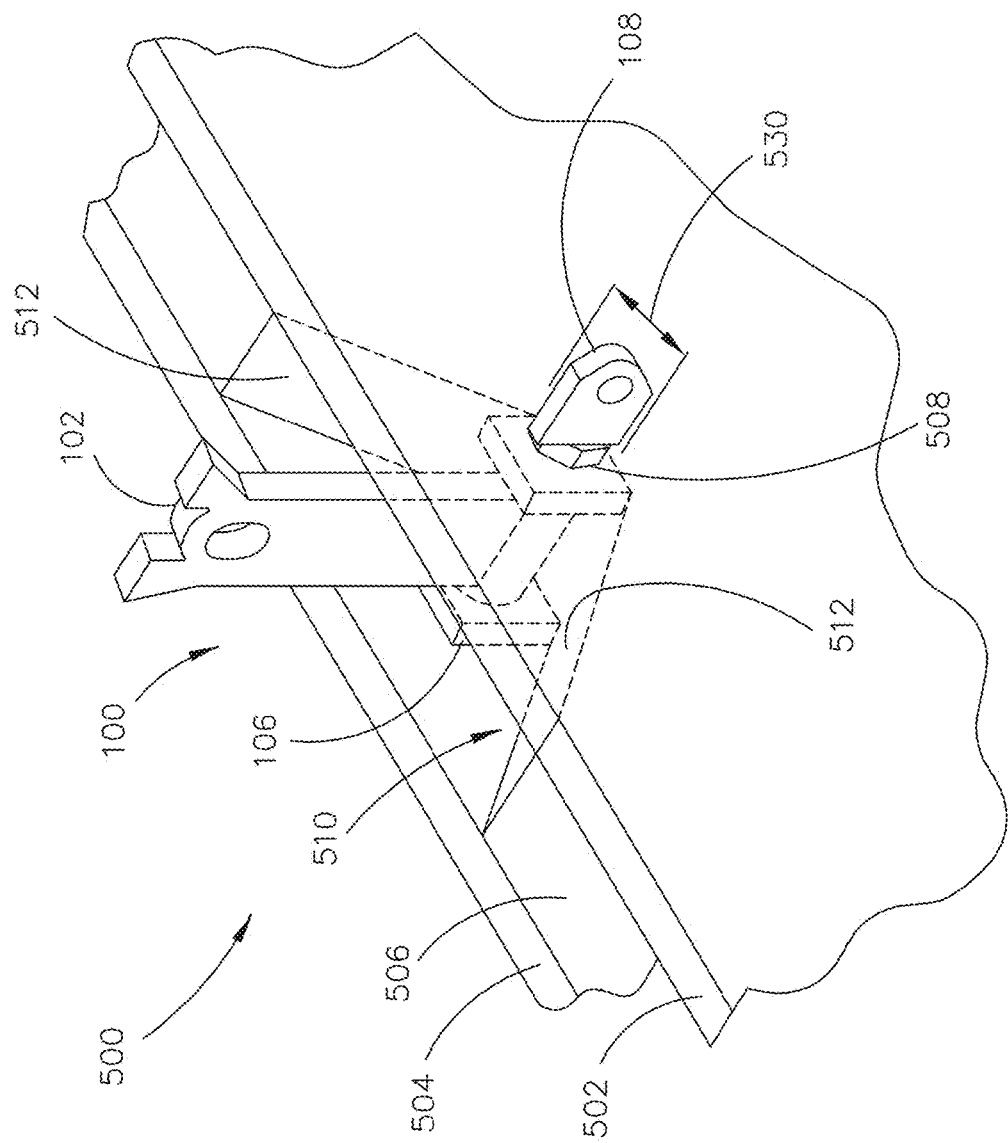
FIG. 5A illustrates a partially-isometric view of a reusable lifting apparatus inserted in an insulated precast concrete sandwich panel, in accordance with one or more embodiments of the present disclosure.
Figure 5C:
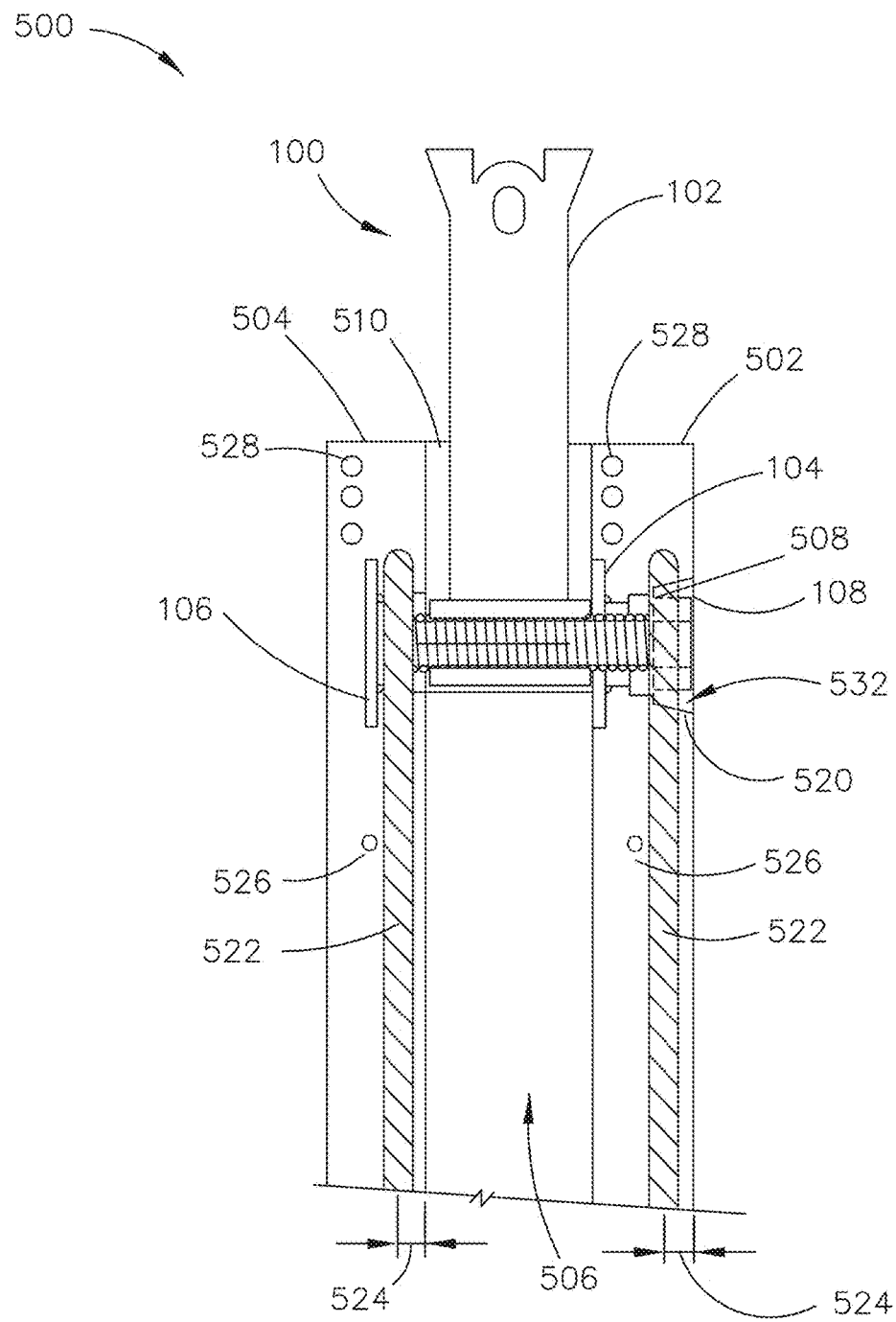
FIG. 5C illustrates a front cross-section view of a reusable lifting apparatus inserted in an insulated precast concrete sandwich panel, in accordance with one or more embodiments of the present disclosure.
Figure 5D:
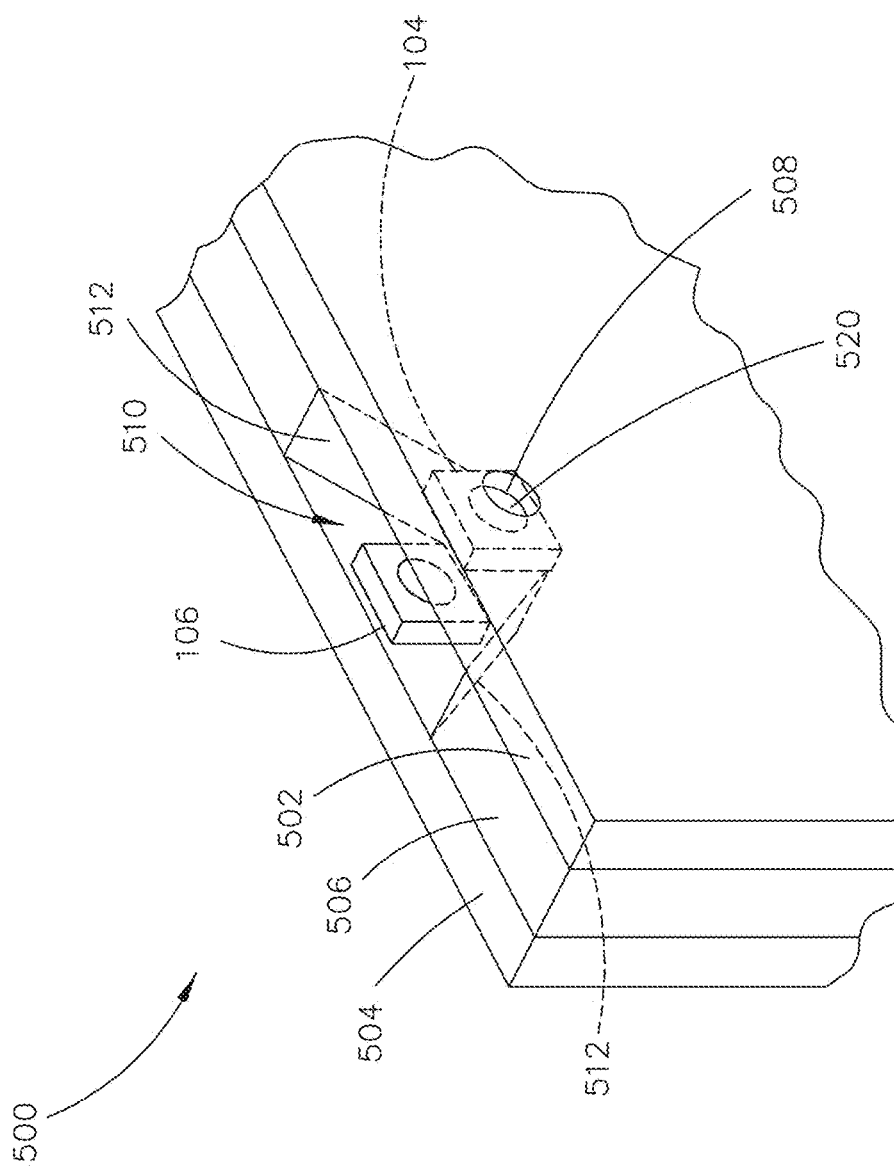
FIG. 5D illustrates a partially-isometric view of an upper mount assembly and a lower mount assembly within an insulated precast concrete sandwich panel, in accordance with one or more embodiments of the present disclosure.
Figure 6C:
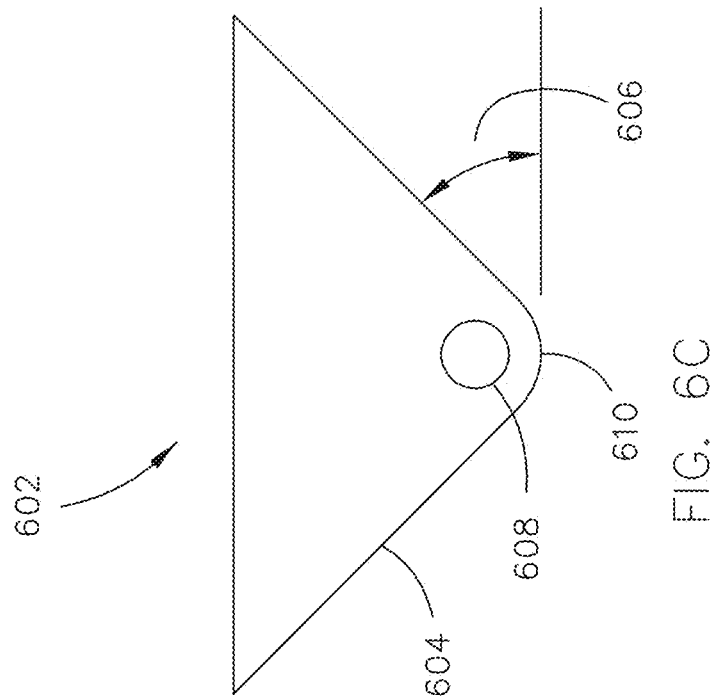
FIG. 6C illustrates a front cross-section view of a block out utilized during fabrication of an insulated precast concrete sandwich panel, in accordance with one or more embodiments of the present disclosure.
Figure 6B:
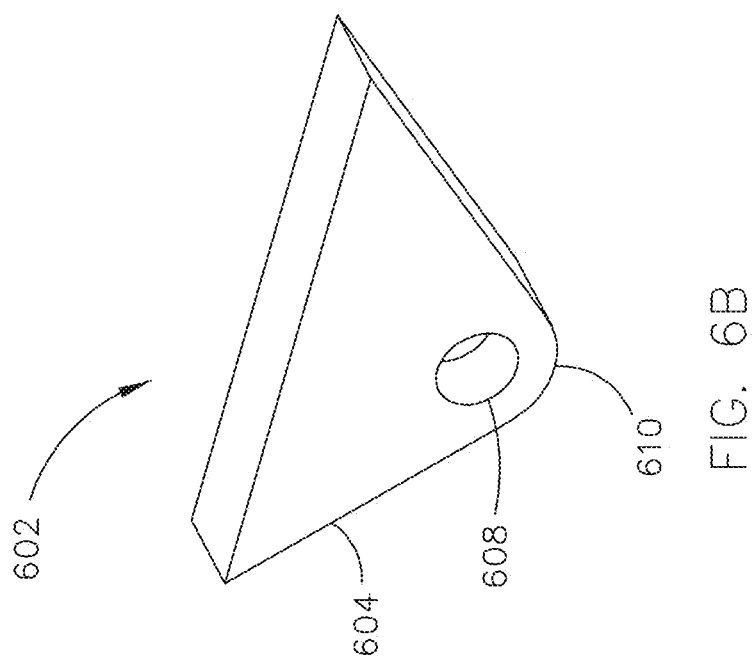
FIG. 6B illustrates an isometric view of a block out utilized during fabrication of an insulated precast concrete sandwich panel, in accordance with one or more embodiment of the present disclosure.
Figure 6E:
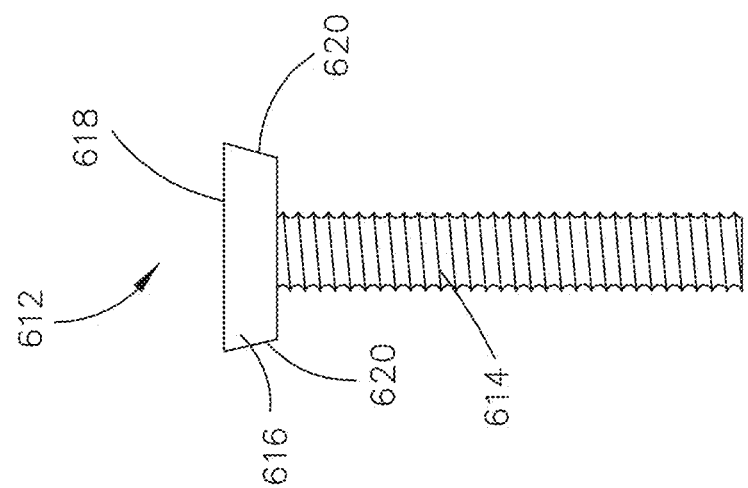
FIG. 6E illustrates a front cross-section view of a casting pin utilized during fabrication of an insulated precast concrete sandwich panel, in accordance with one or more embodiments of the present disclosure.
Figure 6D:
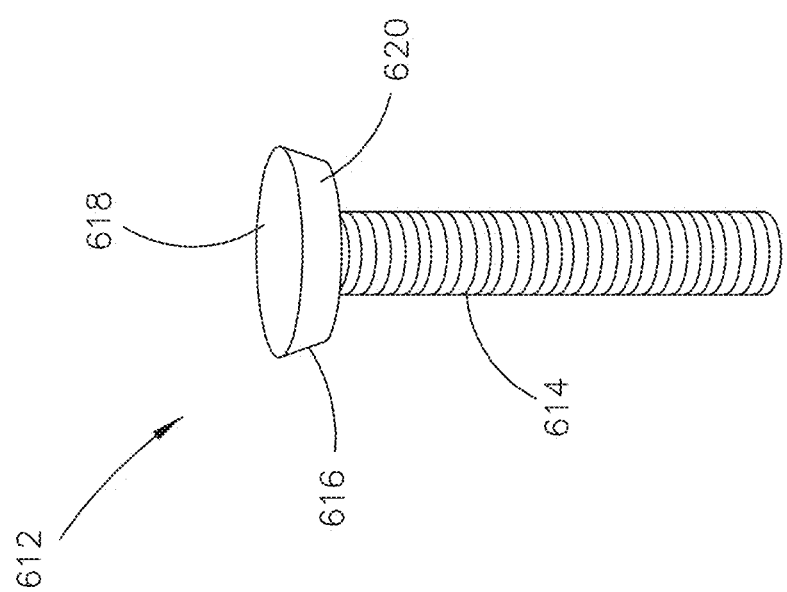
FIG. 6D illustrates a partially-isometric view of a casting pin utilized during fabrication of an insulated precast concrete sandwich panel, in accordance with one or more embodiments of the present disclosure.

Referring now to FIGS. 3I and 3J, an alternative version of the upper mount assembly 104 and the lower mount assembly 106 is illustrated, in accordance with one or more embodiments of the present disclosure. It is noted herein that the embodiments directed to the illustrations in FIGS. 3A-3H may additionally be directed to the illustrations in FIGS. 3I and 3J.

In one embodiment, the upper mount assembly 104 and the lower mount assembly 106 include a first barrel 372 and a second barrel 374. For example, the first barrel 372 may be a diameter that is larger or smaller than a diameter of the second barrel 374. By way of another example, the first barrel 372 may be taller, shorter, or the same height as the second barrel 374. In another embodiment, the barrel 372 and the barrel 374 are one formed component (e.g., formed via casting, forging, stamping, extruding, or the like).

In another embodiment, the upper mount assembly 104 and the lower mount assembly 106 include a hole 376. In another embodiment, the hole 376 accepts a lifting bolt 108. For example, the lifting bolt 108 may enter the hole 376 through the barrel 372. By way of another example, as illustrated in FIG. 3I, the lifting bolt 108 may exit the upper mount assembly 104 through an opening 378 in the barrel 374. By way of another example, the lifting bolt 108 may not exit the barrel 374. For instance, as illustrated in FIG. 3J, the barrel 374 may include a bolt stop 380 within the hole 376.

In another embodiment, the hole 376 of the upper mount assembly 104 is substantially smooth. In another embodiment, the hole 376 of the upper mount assembly 104 and/or the lower mount assembly 106 is threaded, where the threading substantially matches with the thread of the lifting bolt 108. For example, a portion of the hole 376 may be threaded. For instance, the portion of the hole 376 (e.g., through the barrel 372) may be threaded, and the portion of the hole 376 (e.g., through the barrel 374) may be substantially smooth. By way of another example, the entirety of the hole 376 may be threaded. For instance, the portion of the hole 376 (e.g., through the barrel 372) may be threaded, and the portion of the hole 376 (e.g., through the barrel 374) may be threaded to align with the threaded portion through the barrel 372. It is noted herein that leaving a portion of the hole 376 substantially smooth may accelerate the installation of the lifting bolt 108.

In another embodiment, where the hole 376 of the upper mount assembly 104 and the hole 376 of the lower mount assembly 106 are threaded, the hole 376 of the upper mount assembly 104 is threaded to align with the threads of the hole 376 of the lower mount assembly 106.

FIGS. 4A-4D generally illustrate the lifting bolt 108 of the reusable lifting apparatus 100, in accordance with one or more embodiments of the present disclosure. In one embodiment, the lifting bolt 108 includes a bolt 400. In another embodiment, the bolt 400 includes a threaded shaft 402 and a head 404. In another embodiment, the threaded shaft 402 is a selected diameter 416. For example, the selected diameter 416 may range from 1 inch to 2.5 inches. For instance, the selected diameter may be 1.5 inches. In another embodiment, the head 404 is a selected height 418. For example, the selected height 418 may range from 0.5 inch to 2.5 inches. For instance, the selected height 418 may be 1 inch in height. By way of another example, the combined length of the bolt 400 (e.g., the length of the threaded shaft 402 and the height of the head 404) may range from 6 to 15 inches. For instance, where the reusable apparatus is inserted within an insulated precast concrete sandwich panel with an insulation gap of 4 inches, the combined length of the bolt 400 may be 8.375 inches. Additionally, where the reusable apparatus is inserted within an insulated precast concrete sandwich panel with an insulation gap of 5 inches, the combined length of the bolt 400 may be 9.375 inches. Further, where the reusable apparatus is inserted within an insulated precast concrete sandwich panel with an insulation gap of 6 inches, the combined length of the bolt 400 may be 10.375 inches.

In another embodiment, the lifting bolt 108 includes a lug 406. For example, the lug 406 may be a selected width 420 and a selected height 422. For example, the selected width 420 may range from 2 to 4 inches. For instance, the selected width 420 may be 3 inches. By way of another example, the selected height 422 may range from 2 to 5 inches. For instance, the selected height 422 may be 3.375 inches. By way of another example, the combined length of the lifting bolt 108 (e.g., the length of the bolt 400 and the height of the lug 406) may range from 8 to 20 inches. For instance, where the reusable apparatus is inserted within an insulated precast concrete sandwich panel with an insulation gap of 4 inches, the combined length of the bolt 400 may be 11.75 inches. Additionally, where the reusable apparatus is inserted within an insulated precast concrete sandwich panel with an insulation gap of 5 inches, the combined length of the bolt 400 may be 12.75 inches. Further, where the reusable apparatus is inserted within an insulated precast concrete sandwich panel with an insulation gap of 6 inches, the combined length of the bolt 400 may be 13.75 inches.

In another embodiment, the lug 406 is welded onto the head 404 of the bolt 400. In another embodiment, the bolt 400 and the lug 406 are one formed component (e.g., formed via casting, forging, stamping, extruding, or the like).

In another embodiment, the lug 406 includes a hole 408. For example, the hole 408 may be centered within the lug 406 in one or more directions. By way of another example, the hole 408 may not be centered within the lug 406 in any direction. The hole 408 may include any cross-section known in the art including, but not limited to, a circular, elliptic, triangular, rectangular cross-section, or the like. For example, where the hole 408 is circular, a diameter of the hole 408 may range from 1 inch to 2.5 inches. For instance, where the hole 408 is circular, the diameter of the hole 408 may be 1.625 inches. By way of another example, where the hole 408 is elliptic, a short diameter and/or a long diameter of the hole 408 may range from 0.5 to 2 inches. For instance, where the hole 408 is elliptic, the short diameter of the hole 408 may be 1 inch and the long diameter of the hole 408 may be 1.375 inches.

In another embodiment, the lug 406 includes a top edge 410. For example, the top edge 410 may complement the hole 408 (e.g., a rounded top edge 410 mapping to a circular cross-section hole 408). By way of another example, the top edge 410 may be independent of the hole 408 (e.g., a rectangular top edge 410 versus a circular cross-section hole 408). It is noted herein the shape of the lug 406 may substantially map to any precast concrete panel lifting component known in the art.

In another embodiment, the hole 408 is couplable to a lifting assistance component. For example, the hole 408 may be couplable to a T-shackle 412 with a bolt 414. For instance, the bolt 414 may be 1.5 inches in diameter. By way of another example, the hole 408 and/or the T-shackle 412 may be couplable to a rope, a chain, a strap, a hook, or the like. In another embodiment, the apparatus 100 is usable to pull an insulated precast concrete sandwich panel from a pre-casting bed post-fabrication via the T-shackle 412 coupled to the lug 406 of the lifting bolt 108, as described in detail further herein.

FIGS. 5A-5D generally illustrate a reusable lifting apparatus 100 inserted in an insulated precast concrete sandwich panel 500, in accordance with one or more embodiments of the present disclosure.

In one embodiment, the panel 500 includes an upper layer 502. In another embodiment, the upper mount assembly 104 of the apparatus 100 is embedded in the upper layer 502. For example, the upper mount assembly 104 of the apparatus 100 may be embedded in the upper layer 502 during fabrication of the panel 500. In another embodiment, the panel 500 includes a lower layer 504. For instance, the upper mount assembly 104 may be embedded within the upper layer 502 such that a surface of the upper mount assembly 104 (e.g., surface of a nut 302, barrel 352, etc.) is flush with a surface of the upper layer 502. In this regard, the upper mount assembly 104 is a one-time component of the apparatus 100.

In another embodiment, the lower mount assembly 106 of the apparatus 100 is embedded in the lower layer 504. For example, the lower mount assembly 106 of the apparatus 100 may be embedded in the lower layer 504 during fabrication of the panel 500. For instance, the lower mount assembly 106 may be embedded within the lower layer 504 such that a surface of the lower mount assembly 106 (e.g., surface of a nut 322, barrel 352, etc.) is flush with a surface of the lower layer 504. In this regard, the lower mount assembly 106 is a one-time component of the apparatus 100.

It is noted herein that the upper layer 502 or the lower layer 504 may be equivalent to a first layer or a second layer, for purposes of the present disclosure.

In another embodiment, the apparatus 100 is usable for a range of panel 500 thicknesses. For example, the apparatus 100 may be used with a panel 500 of a thickness ranging from 6 to 16 inches. For instance, the apparatus 100 may be used with a panel 500 with a 4-inch insulation gap (e.g., a 10-inch panel with two 3-inch concrete layers 502, 504 and a 4-inch insulation layer 506). Additionally, the apparatus 100 may be used with 8-inch thick solid concrete panels.

In another embodiment, the panel 500 includes an insulation layer 506 sandwiched between the upper layer 502 and the lower layer 504. In another embodiment, the lifting insert 102 of the apparatus 100 is inserted within a void 510 of the insulation layer 506 during moving and/or positioning of the panel 500. For example, the void 510 may be substantially rectangular prism-shaped. It is noted herein the void 510 may be any three-dimensional geometric shape known in the art.

In another embodiment, the upper layer 502 includes an opening 508. In another embodiment, the opening 508 is a selected diameter 530. For example, the selected diameter 530 may range from 2 to 6 inches. For instance, the selected diameter 530 may be 3.5 inches. In another embodiment, the opening 508 is inset within a surface of the upper layer 502 in a sleeve 520 at a selected depth 532. For example, the selected depth 532 may range from 0.75 inches to 2 inches. For instance, the selected depth 532 may be 1.125 inches.

In another embodiment, the lifting bolt 108 is inserted through the opening 508 in the upper layer 502 and engages the upper mount assembly 104, the lifting insert 102, and/or the lower mount assembly 106 during moving and/or positioning of the panel 500. It is noted herein the lower layer 504 may include an opening in addition to the opening 508 for the lifting bolt 108 to pass through, such that the lifting bolt 108 passes through an exterior surface of the lower layer 504.

In another embodiment, the void 510 includes one or more sides 512. In another embodiment, the one or more sides 512 are set a selected angle 514 from a substantially horizontal plane (e.g., the plane substantially parallel to the surface of the panel 500 through which the lifting insert 102 of the apparatus 100 is inserted). For example, the selected angle 514 may range from 10 to 80 degrees. For instance, the selected angle 514 may be 45 degrees.

In another embodiment, the void 510 is a selected depth 516 and a selected width 518. For example, the selected depth 516 and/or the selected width 518 may be dependent on the length of the lifting insert 102 of the apparatus 100. By way of another example, the selected depth 516 and/or the selected width 518 may be dependent on an amount the lifting insert 102 should extend from the panel 500, either upright or laying against a side 512. By way of another example, the selected depth 516 and/or the selected width 518 may be dependent on an amount the lifting insert 102 should be inserted into the panel 500, based on the location of the opening 508 through the upper layer 502. By way of another example, the selected depth 516 of the void 510 may range from 4 inches to 12 inches. For instance, the selected depth 516 of the void 510 may be 7.25 inches. Additionally, the selected depth 516 of the void 510 may be 7.75 inches. By way of another example, the selected width 518 may be the width of the insulation layer 506. By way of another example, the selected width 518 may be a portion of the width of the insulation layer 506.

In another embodiment, one or more of the upper layer 502 and/or the lower layer 504 includes one or more support members 522. For example, the one or more support members 522 may be set within the upper layer 502 and/or the lower layer 504 in a first substantially perpendicular orientation relative to the axis of the lifting bolt 108. By way of another example, at least a portion of each member of the one or more support members 522 may be set within the upper layer 502 and/or the lower layer 504 such that the one or more support members 522 surround the upper mount assembly 104 or the lower mount assembly 106 embedded within the upper layer 502 or the lower layer 504, respectively. In another embodiment, the one or more support members 522 are embedded a selected depth 524 from a surface of the upper layer 502 and/or the lower layer 504. For example, the selected depth 524 may range from 0.25 of an inch to 1 inch. For instance, where the upper layer 502 and/or the lower layer 504 is 3 inches thick, the selected depth 524 may be 7/16 inch.

In another embodiment, one or more of the upper layer 502 and/or the lower layer 504 includes one or more support members 526. For example, the one or more support members 526 may be set within the upper layer 502 and/or the lower layer 504 in a second substantially perpendicular orientation relative to the axis of the lifting bolt 108. By way of another example, the one or more support members 526 may be set within the upper layer 502 and/or the lower layer 504 such that the one or more support members 522 are below the upper mount assembly 104 or the lower mount assembly 106 embedded within the upper layer 502 or the lower layer 504, respectively (e.g., farther from the lifting insert 102 surface). In another embodiment, the one or more support members 522 and the one or more support members 526 are affixed to form a grid or lattice structure within the upper layer 502 and/or the lower layer 504.

In another embodiment, one or more of the upper layer 502 and/or the lower layer 504 includes one or more support members 528. For example, the one or more support members 528 may be set within the upper layer 502 and/or the lower layer 504 in a second substantially perpendicular orientation relative to the axis of the lifting bolt 108. By way of another example, the one or more support members 528 may be set within the upper layer 502 and/or the lower layer 504 such that the one or more support members 528 are above (e.g., closer to the lifting insert 102 insert surface) the upper mount assembly 104 or the lower mount assembly 106 embedded within the upper layer 502 or the lower layer 504, respectively (e.g., closer to the lifting insert 102 insert surface).

It is noted herein the addition of the one or more support members 522, 526, 528 may increase resistance to stress concentrating around the apparatus 100 during the positioning and/or moving of the panel 500. It is additionally noted herein the upper mount assembly 104 and/or of the lower mount assembly 106 may be affixed to the one or more support members 522, 526, and/or 528 during the fabrication process.

It is additionally noted herein the one or more support members 522, 526, and/or 528 may include, but is not limited to reinforcing-bar (e.g., #4, #5, #6 rebar), in either a straight or U-shape form, and of a selected diameter and/or a selected length. For example, the diameter of the one or more support members 522, 526, and/or 528 may range from 0.25 inches to 1.25 inches. For instance, the diameter of the one or more support members 522, 526, and/or 528 may be 0.875 inches. Additionally, the diameter of the one or more support members 522, 526, and/or 528 may be 0.375 inches. By way of another example, the selected length may range from 12 to 48 inches. For instance, the selected length may be 24 inches.

In another embodiment, the sleeve 520 is filled with a selected material following installation of the panel 500. For example, the selected material may include, but is not limited to, concrete (e.g., in a plug shape), caulk, rubber, wood, or another space-filling material. In another embodiment, the void 510 is filled following installation of the panel 500. For example, the void 510 may be filled with a block substantially similar to the shape of the void 510. For instance, the block may be fabricated from insulation (e.g., insulation substantially similar to, or different from, the insulation layer 506), rubber, concrete, caulk, wood, or another space-filling material.

Although embodiments of the present disclosure illustrate the panel 500 as being substantially rectangular, it is noted herein that the reusable apparatus 100 may be utilized with a panel 500 of any shape known in the art (e.g., triangular-shaped panels 500, circular-shaped panels 500, or the like). Therefore, the above description should not be interpreted as a limitation on the scope of the present disclosure but merely an illustration.

FIGS. 6A-6E generally illustrate a block out and a casting pin utilized during fabrication of the insulated precast concrete sandwich panel 500, in accordance with one or more embodiments of the present disclosure.

In one embodiment, the void 510 in the insulation layer 506 is formed during fabrication of the panel 500 by a block out 602. In another embodiment, the opening 508 and the sleeve 520 in the upper layer 502 is formed during fabrication of the panel 500 by a casting pin 612.

In another embodiment, the block out 602 includes one or more sides 604. For example, the one or more sides 512 of the void 510 may map to the one or more sides 604 of the block out 602. In another embodiment, the one or more sides 604 are set a selected angle 606 from a substantially horizontal plane (e.g., the plane substantially parallel to the surface of the panel 500 through which the lifting insert 102 of the apparatus 100 is inserted). For example, the selected angle 606 may range from 10 to 80 degrees. For instance, the selected angle 606 may be 45 degrees.

In another embodiment, the block out 602 includes a hole 608. For example, the hole 608 may be configured to accept the casting pin 612 or the lifting bolt 108 during fabrication of the panel 500. In another embodiment, the block out 602 includes a top edge 610. For example, the top edge 610 may complement the hole 608 (e.g., a rounded top edge 610 mapping to a circular cross-section hole 608). By way of another example, the top edge 610 may be independent of the hole 608 (e.g., a rectangular top edge 610 versus a circular cross-section hole 608).

In another embodiment, the casting pin 612 includes a shaft 614 and a head 616. In another embodiment, the shaft 614 of the casting pin 612 is threaded. For example, the casting pin 612 may be match-threaded to the lower mount assembly 106, the upper mount assembly 104 and/or the tube 220 of the lifting insert 102. It is noted herein the lifting bolt 108 may be used in place of a casting pin 612.

In another embodiment, the pairing of the shaft 614 and the opening 508, and the pairing of the head 616 and the sleeve 520, each include a selected tightness tolerance. For example, the selected tightness tolerance may prevent poured concrete leaking into the void 510 in the insulation layer 506. By way of another example, the selected tightness tolerance may prevent poured concrete leaking into an area reserved for a surface of the upper mount assembly 104 (e.g., surface of a nut 302, barrel 352, etc.) or a surface of the lower mount assembly 106 (e.g., surface of a nut 322, barrel 352, etc.). By way of another example, the selected tightness tolerance may prevent a shrinking of the sleeve 520 such that the sleeve 520 cannot accept the head 404 and/or the lug 406 of the lifting bolt 108.

In another embodiment, the head 616 includes a beveled side 620. For example, the beveled side 620 may reduce the possibility of an improper sizing of the sleeve 520 formed by the beveled side 620. In another embodiment, a top surface 618 of the head 616 is flush with an exterior surface of the upper layer 502. It is noted herein, however, that the top surface 618 of the head 616 may extrude from, or be inset within, the exterior surface of the upper layer 502 a selected distance.

In another embodiment, the block out 602 and/or the casting pin 612 are fabricated from a selected material. For example, the selected material may include, but is not limited to, a plastic, a metal, a wood, a rubber, or the like.

In another embodiment, one or more securing components are embedded within the block out 602. For example, one or more magnets may be embedded within the block out 602, where the one or more magnets interact with the upper mount assembly 104 and/or the lower mount assembly 106 to prevent the block out 602 from moving during fabrication of the panel 500. In another embodiment, the block out 602 and the casting pin 612 are removable from the panel 500 post-fabrication. In this regard, the block out 602 and the casting pin 612 may be reusable during fabrication of subsequent panels 500.

Figure 7A:
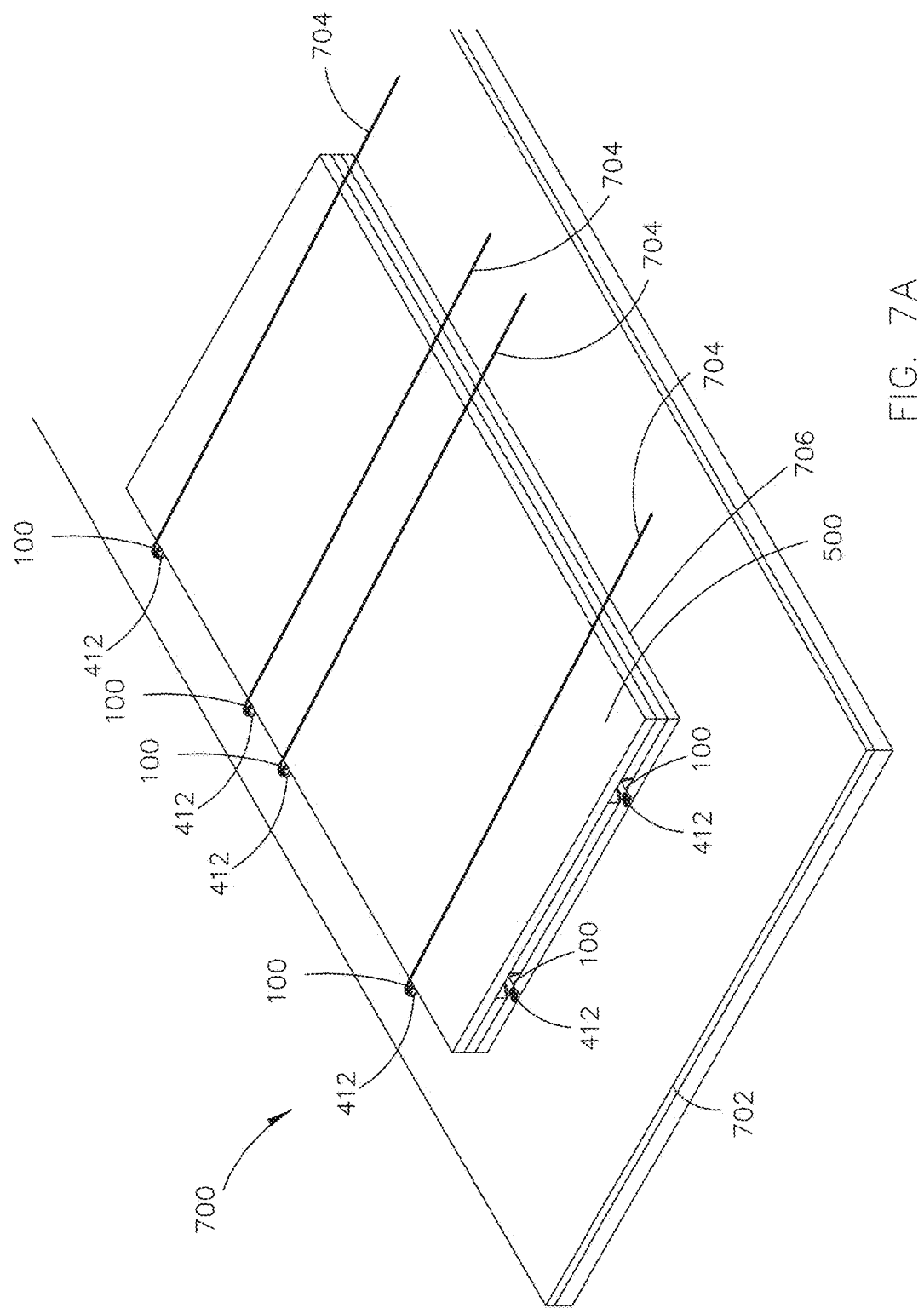
FIG. 7A illustrates an insulated precast concrete sandwich panel lying in a substantially flat position, in accordance with one or more embodiments of the present disclosure.
Figure 7C:
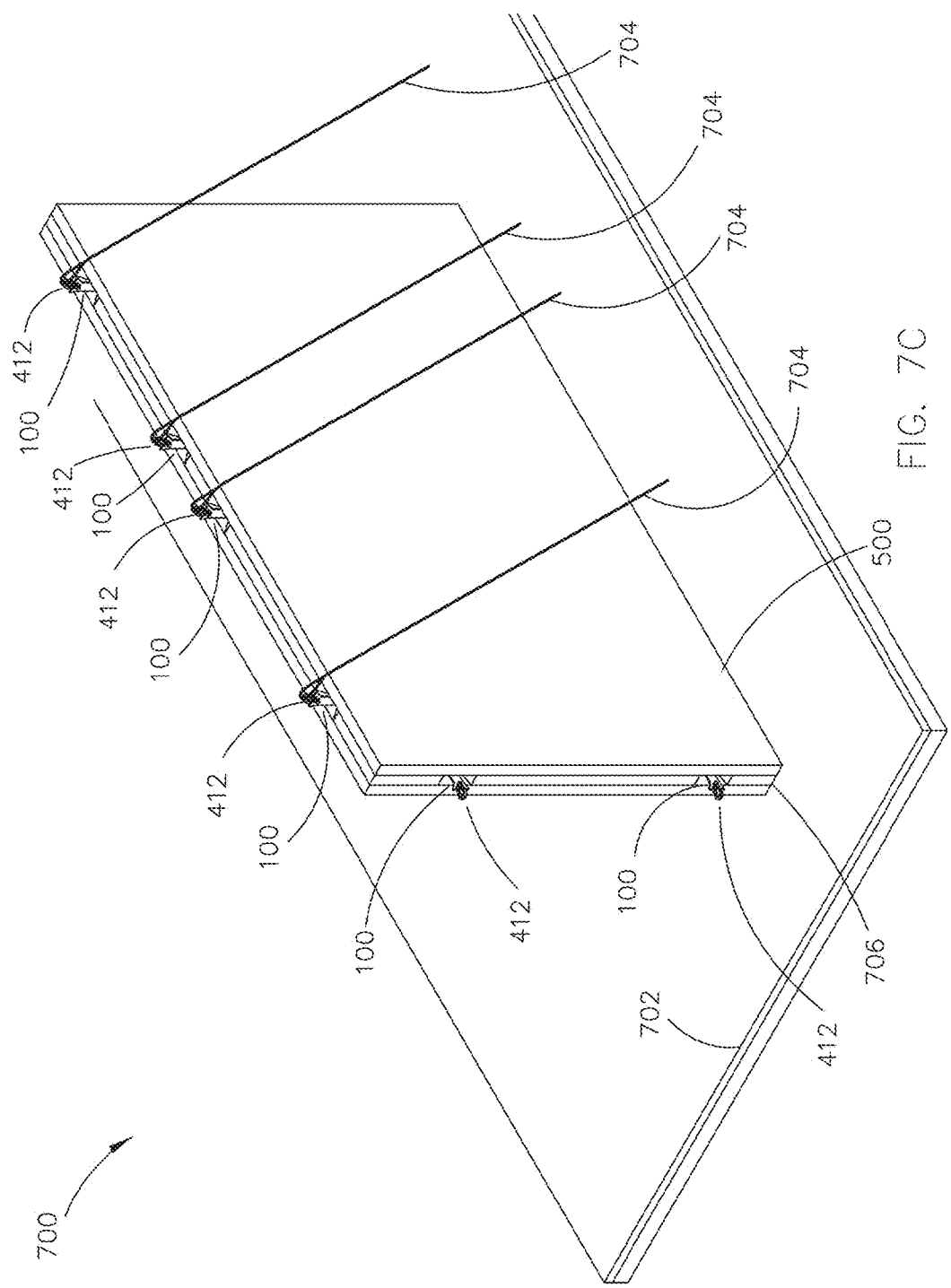
FIG. 7C illustrates an insulated precast concrete sandwich panel standing in a substantially upright position, in accordance with one or more embodiments of the present disclosure.

FIGS. 7A-7C generally illustrate a panel 500 being reoriented from a substantially flat orientation to a substantially upright orientation, in accordance with one or more embodiments of the present disclosure.

In one embodiment, the panel 500 rests on and/or in a precasting bed 702 (e.g., panel 500 forming system) on a substantially planar surface 700 (e.g., in a first substantially planar orientation). In another embodiment, one or more reusable lifting apparatuses 100 with one or more T-shackles 412 are inserted within the panel 500. In another embodiment, one or more tilting assistance components 704 (e.g., rope, chain, straps, hooks, or the like) are coupled to the one or more T-shackles 412.

In another embodiment, an exerted force on the one or more tilting assistance components 704 cause the panel 500 to tilt upward on an edge 706 of the panel 500. In another embodiment, the panel 500 tilts on the edge 706 from a substantially flat orientation to a substantially upright orientation (e.g., rotated from the first substantially planar orientation to a second substantially planar orientation substantially perpendicular to the first substantially planar orientation).

Although embodiments of the present disclosure are directed to tilting the panel 500 on a long edge, it is noted herein that the panel 500 may be tilted on a short edge. For example, the panel 500 may be tilted via one or more reusable lifting apparatuses 100 inserted within a short edge of the panel 500 instead of via one or more reusable lifting apparatuses 100 inserted within a long edge of the panel 500. Therefore, the above description should not be interpreted as a limitation on the scope of the present disclosure but merely an illustration.

FIGS. 8A-8D generally illustrate a panel 500 being lifted from a transport trailer and positioned on a foundation, in accordance with one or more embodiments of the present disclosure.

In one embodiment, the panel 500 including one or more reusable lifting apparatuses 100 in one or more voids 510 is transported to a job site 800 via a transport trailer 802 (e.g., transported in the second substantially planar orientation). For example, the panel 500 may include one or more reusable lifting apparatuses 100 in one or more voids 510 on one or more ends. For instance, the panel 500 may include one or more reusable lifting apparatuses 100 in one or more voids 510 on two ends. In another embodiment, a crane 804 is coupled to the panel 500. For example, the crane 804 may include one or more lifting, or spreader beams 808 including one or more lifting assistance components 806 (e.g., rope, chain, straps, hooks or the like), where the one or more lifting assistance components 806 may be coupled to the one or more reusable lifting apparatuses 100.

In another embodiment, the panel 500 is lifted from the transport trailer 802 via the crane 804. In another embodiment, the panel 500 is rotated via the one or more lifting beams 808 of the crane 804 (e.g., rotated from the second substantially planar orientation to a third substantially planar orientation substantially perpendicular to the first substantially planar orientation and the second substantially planar orientation). For example, rotating the panel 500 may reorient the panel 500 from a substantially landscape orientation to a substantially portrait orientation. In another embodiment, the panel 500 is positioned on a foundation via the crane 804.

Figure 8A:
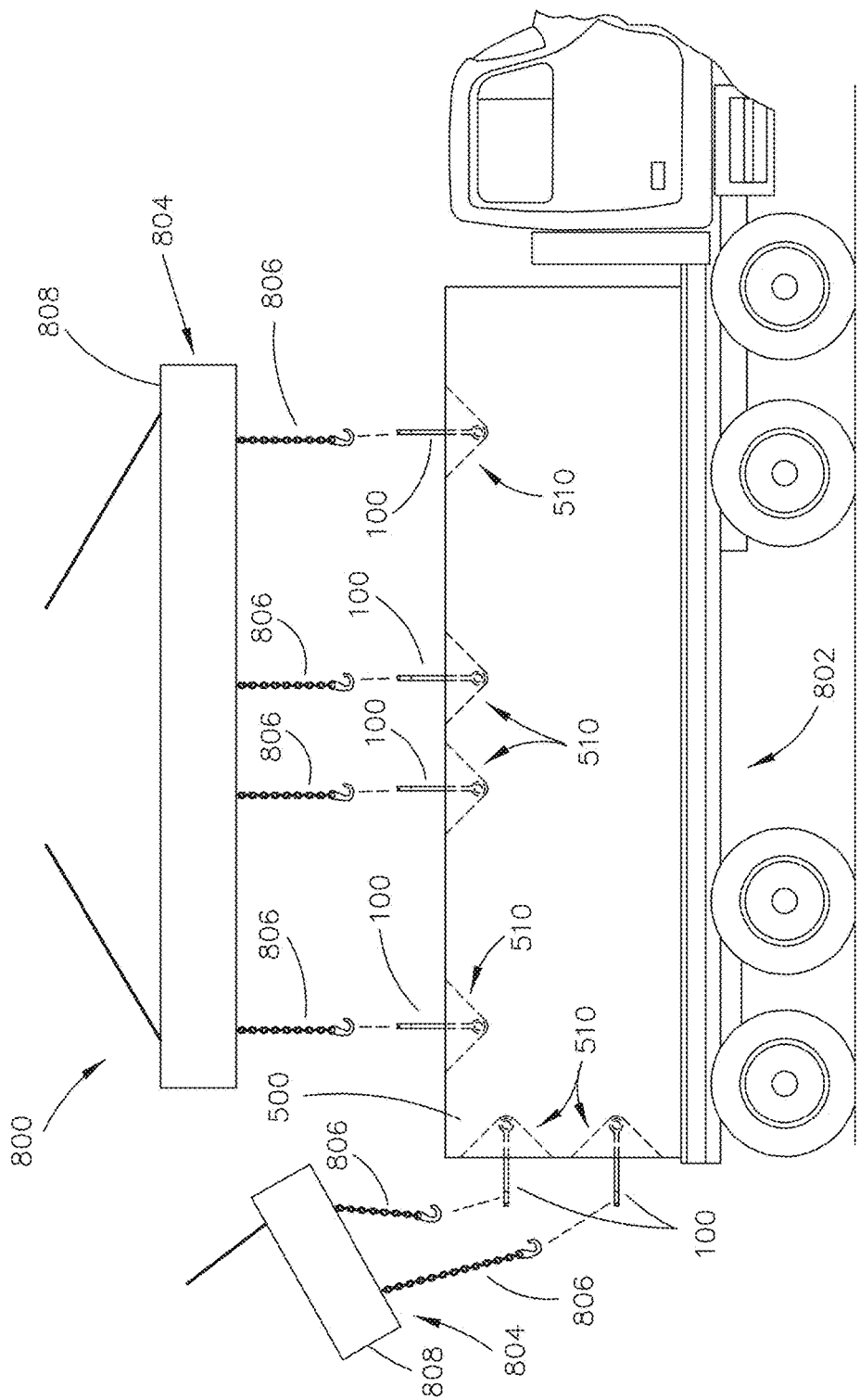
FIG. 8A illustrates an insulated precast concrete sandwich panel transported on a transport trailer, in accordance with one or more embodiments of the present disclosure.
Figure 8B:
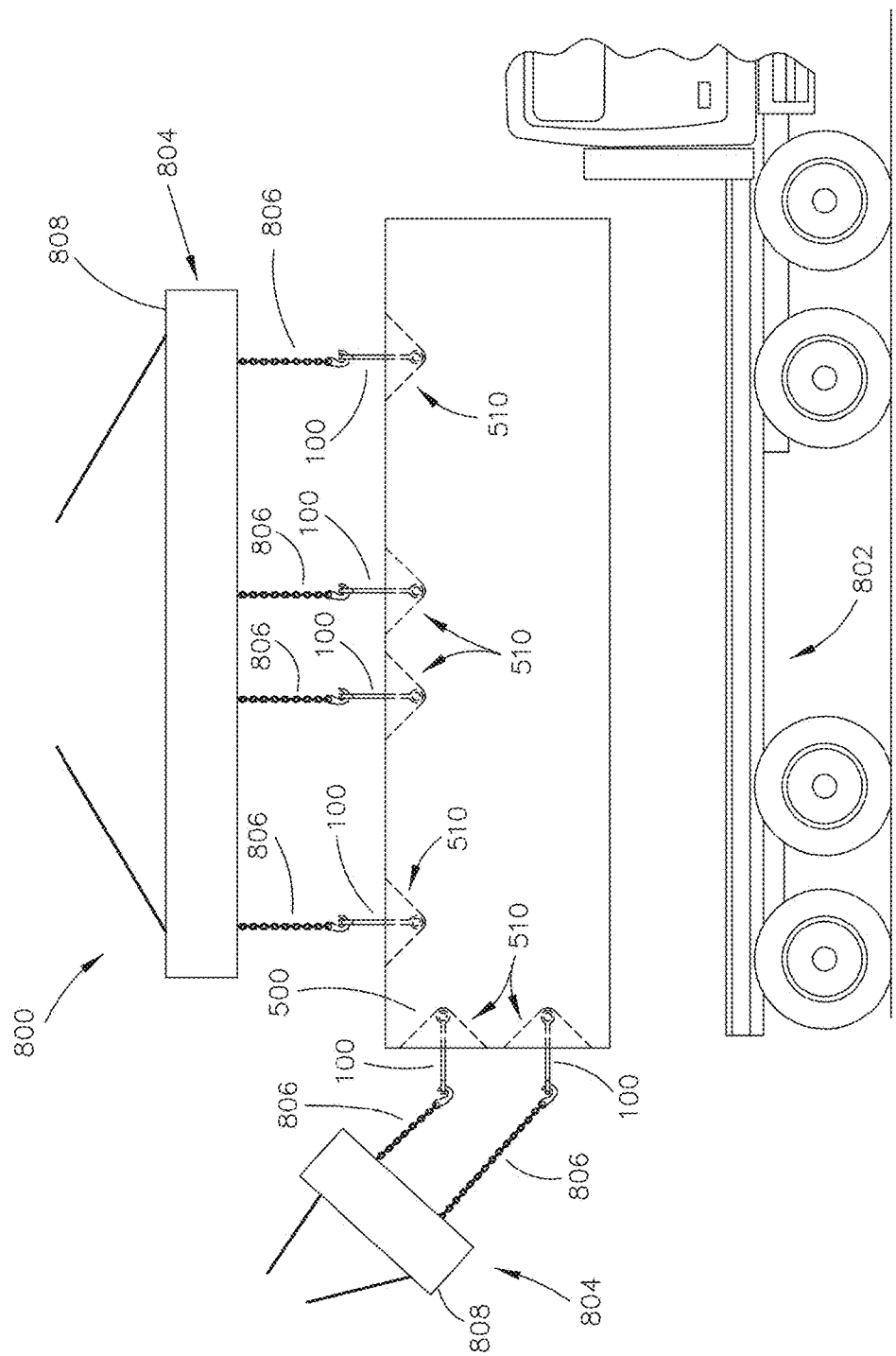
FIG. 8B illustrates an insulated precast concrete sandwich panel removed from a transport trailer via a set of reusable lifting apparatuses, in accordance with one or more embodiments of the present disclosure.
Figure 8C:
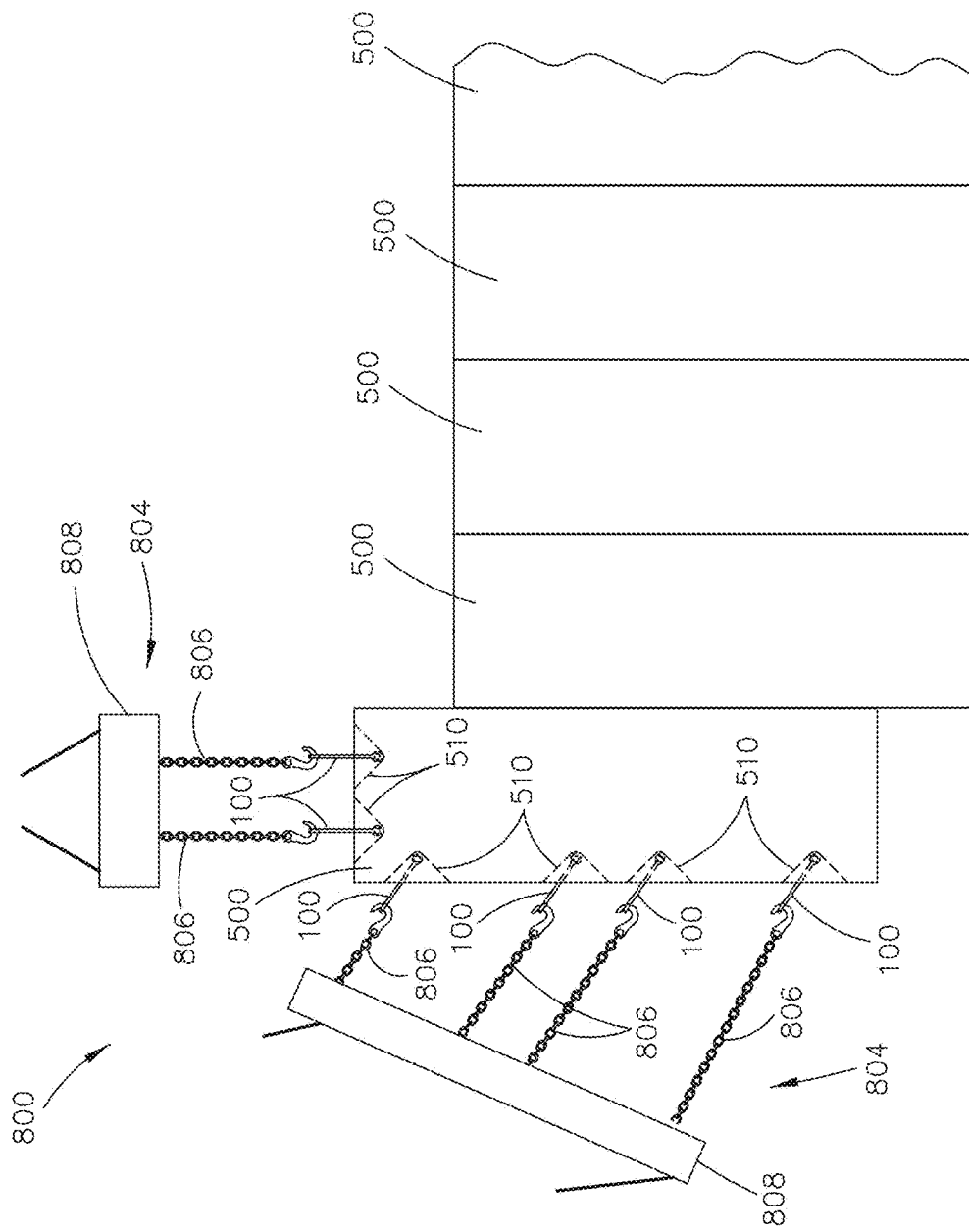
FIG. 8C illustrates an insulated precast concrete sandwich panel rotated via a set of reusable lifting apparatuses inserted in the precast concrete panel, in accordance with one or more embodiments of the present disclosure.

It is noted herein that the lifting insert 102 of the one or more reusable lifting apparatuses 100 installed within the panel 500 may pivot about an axis through the lifting bolt 108 to lay against the sides 512 of the void 510 during rotation of the panel 500 from the substantially landscape orientation to the substantially portrait orientation. For example, the non-lifting one or more reusable lifting apparatus 100 on the short end of the panel 500 may lay against a side 512 of the voids 510, while the lifting one or more reusable lifting apparatus 100 on the long end of the panel 500 may be substantially vertical when the panel 500 is lifted from the truck in the substantially landscape orientation, as illustrated in FIG. 8B. By way of another example, the one or more reusable lifting apparatus 100 may pivot within respective voids 510 while the panel 500 is rotated from the substantially landscape orientation to the substantially portrait orientation. For instance, the selected angle 514 being 45 degrees may serve to smooth the transition from the substantially landscape orientation to the substantially portrait orientation, preventing unnecessary motion of the panel 500 as it rotates. By way of another example, the non-lifting one or more reusable lifting apparatus 100 on the long end of the panel 500 may lay against a side 512 of the voids 510, while the lifting one or more reusable lifting apparatus 100 on the short end of the panel 500 may be substantially vertical when the panel 500 is positioned in place in the substantially portrait orientation, as illustrated in FIG. 8C.

Although embodiments of the present disclosure are directed to rotating the panel 500 and positioning the panel 500 in a portrait orientation, it is noted herein that the panel 500 may be lifted from the transport trailer 802 and positioned on a foundation via the crane 804 without rotating the panel 500. For example, the panel 500 may be positioned on a foundation in a landscape orientation instead of a portrait orientation. Therefore, the above description should not be interpreted as a limitation on the scope of the present disclosure but merely an illustration.

Although embodiments of the present disclosure are directed to the panel 500 being transported in a substantially upright position on the transport trailer 802, it is noted herein the panel 500 may be transported in a substantially flat position on the transport trailer 802. In this regard, the panel 500 may be lifted from the transport trailer 802 and laid on the ground, where a job site crew may then tilt the panel 500 into an upright position as illustrated in FIGS. 7A-7C, either directly into position or in preparation for positioning as illustrated in FIGS. 8B-8D. Therefore, the descriptions should not be interpreted as a limitation on the scope of the present disclosure but merely an illustration.

Figure 9:
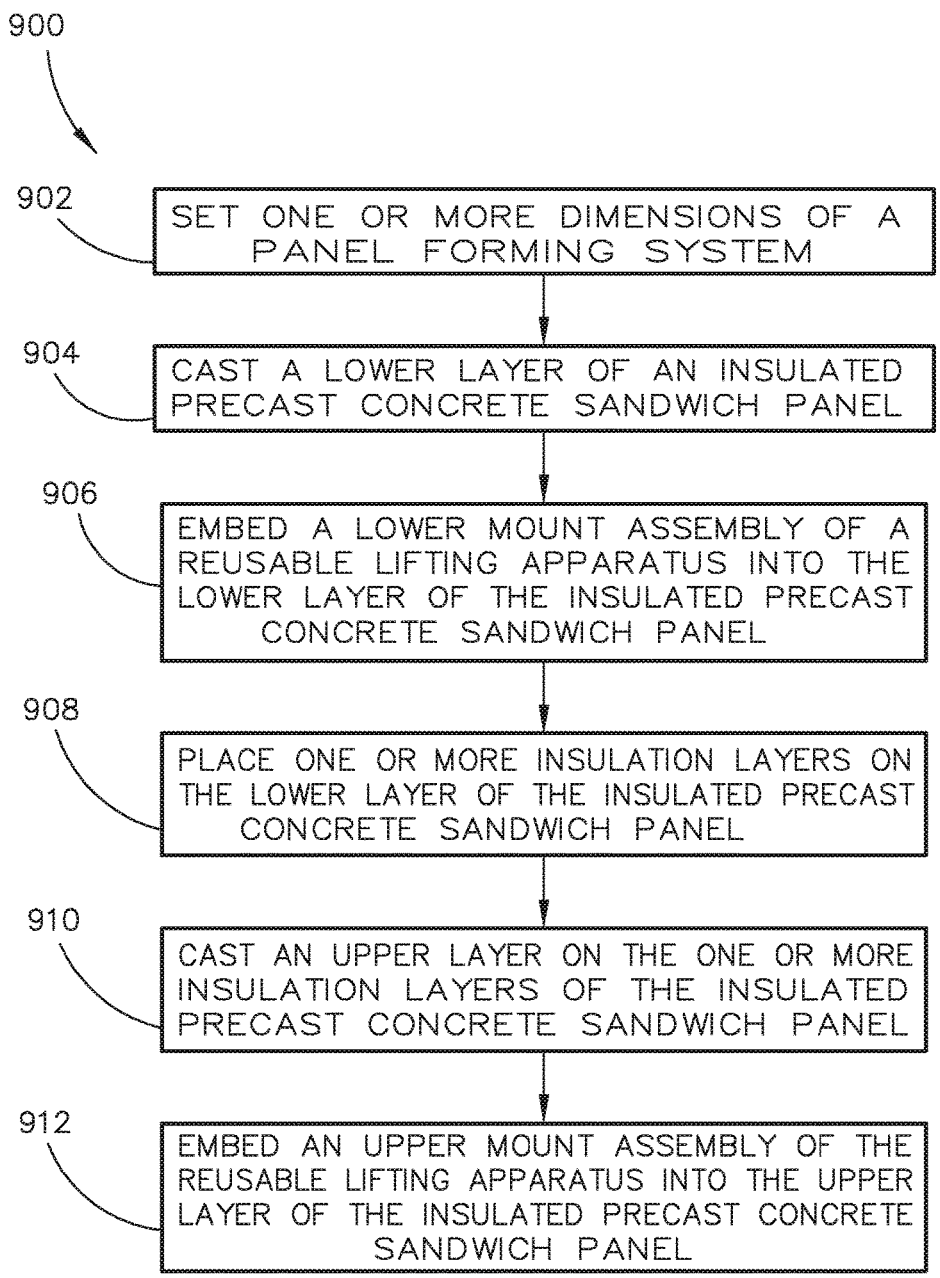
FIG. 9 illustrates a flow diagram depicting a method for fabricating an insulated precast concrete sandwich panel.

FIG. 9 illustrates a method 900 for fabricating the insulated precast concrete sandwich panel 500, in accordance with one or more embodiments of the present disclosure. It is noted herein the method 900 for fabricating the insulated precast concrete sandwich panel 500 may be accomplished with all or a portion of the following steps in any order. Therefore, the above description should not be interpreted as a limitation on the scope of the present disclosure but merely an illustration.

In step 902, one or more dimensions of a panel 500 forming system are set. In one embodiment, the layer 502, 504 are cast in a panel 500 forming system (e.g., a precasting bed, a form, or a mold). For example, the panel 500 forming system may include one or more slidable side members for setting the width of the panel 500. By way of another example, the panel 500 forming system may include one or more slidable head members for setting the length of the panel 500. It is noted herein the height of the side members and the head members may be adjusted according to the desired thickness of the panel 500.

In step 904, a lower layer 504 of the insulated precast concrete sandwich panel 500 is cast. In one embodiment, the lower layer 504 is cast by pouring concrete mix into the panel 500 forming system.

In step 906, a lower mount assembly 106 is embedded within the lower layer 504 while the lower layer 504 is cast. For example, the lower mount assembly 106 may be suspended from the top and/or the sides and held in place while concrete mix is poured into the panel 500 forming system to form the lower layer 504. In another embodiment, the lower mount assembly 106 is embedded within the lower layer 504 such that a surface of the lower mount assembly 106 is substantially flush with a surface of the lower layer 504 (e.g., the surface exposed to air during fabrication). In another embodiment, one or more support members 522, 526, and/or 528 are embedded within the lower layer 504 while the lower layer 504 is cast. For example, the one or more support members 522, 526, and/or 528 may be suspended from the top and/or the sides and held in place while concrete mix is poured into the panel 500 forming system to form the lower layer 504.

In step 908, one or more insulation layers 506 of the insulated precast concrete sandwich panel 500 are placed on the lower layer 504. In one embodiment, the one or more insulation layers 506 include a void 510 to accommodate the space needed for reusable lifting apparatuses 100. In another embodiment, the one or more insulation layers 506 include a block out 602 in the void 510, where the block out 602 prevents concrete from leaking into the void 510. It is noted herein that the void 510 may be precut based on known positions of the reusable lifting apparatuses 100. It is additionally noted herein that the void 510 may be cut as the one or more insulation layers 506 are placed.

Although the above embodiments are directed to forming the panel 500 with a void 510 for a single reusable lifting apparatus 100, it is noted herein that the panel 500 may be formed with multiple voids 510 for multiple reusable lifting apparatuses 100. Therefore, the above description should not be interpreted as a limitation on the scope of the present disclosure but merely an illustration.

In step 910, an upper layer 502 of the insulated precast concrete sandwich panel 500 is cast on top of the one or more insulation layers 506. In one embodiment, the upper layer 502 is cast by pouring concrete mix into the panel 500 forming system.

In step 912, an upper mount assembly 104 is embedded within the upper layer 502 while the upper layer 502 is cast. In one embodiment, the upper mount assembly 104 is coupled to the lower mount assembly 106 cast within the lower layer 504 via the casting pin 612 and held in place while concrete mix is poured into the panel 500 forming system to form the upper layer 502, where the casting pin 612 passes through the hole 608 in the block out 602. In another embodiment, the upper mount assembly 104 is suspended from the top and/or the sides and held in place while concrete mix is poured into the panel 500 forming system to form the upper layer 502.

In another embodiment, the upper mount assembly 104 is embedded within the upper layer 502 such that a surface of the upper mount assembly 104 is substantially flush with a surface of the upper layer 502 (e.g., the surface exposed to air during fabrication). In another embodiment, the head 616 of the casting pin 612 produces the sleeve 520 while concrete mix is poured into the panel 500 forming system to form the upper layer 502. In another embodiment, one or more support members 522, 526, and/or 528 are embedded within the upper layer 502 while the upper layer 502 is cast. For example, the one or more support members 522, 526, and/or 528 may be suspended from the top and/or the sides and held in place while concrete mix is poured into the panel 500 forming system to form the upper layer 502.

Figure 10:
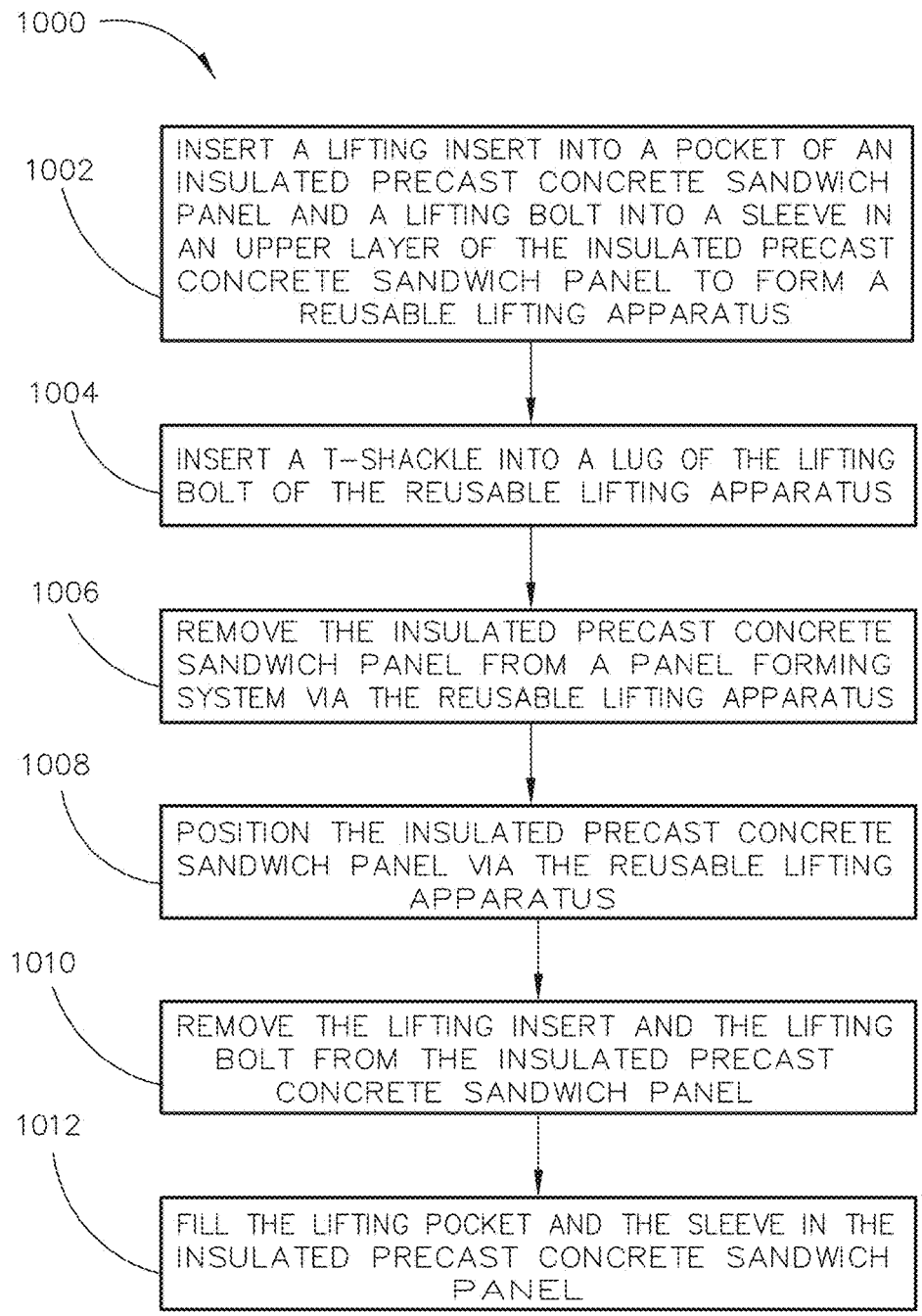
FIG. 10 illustrates a flow diagram depicting a method for removing and/or positioning an insulated precast concrete sandwich panel with one or more reusable lifting apparatuses.

FIG. 10 illustrates a method 1000 for removing and/or positioning the insulated precast concrete sandwich panel 500, in accordance with one or more embodiments of the present disclosure. It is noted herein that all or a portion of the steps of method 900 may be applicable to the method 1000. It is additionally noted herein the method 1000 for removing and/or positioning the insulated precast concrete sandwich panel 500 may be accomplished with all or a portion of the following steps in any order. Therefore, the above description should not be interpreted as a limitation on the scope of the present disclosure but merely an illustration.

In step 1002, the lifting insert 102 is inserted into the void 510 of the panel 500 and the lifting bolt 108 is inserted into the sleeve 520 in the upper layer 502 of the panel 500 to form the reusable lifting apparatus 100. In one embodiment, the lifting insert 102 and/or the lifting bolt 108 is inserted into the void 510 or the sleeve 520, respectively, while the panel 500 lays in the precasting bed 702 (e.g., the panel 500 forming system). In another embodiment, the lifting insert 102 and/or the lifting bolt 108 is inserted into the void 510 or the sleeve 520, respectively, when the panel 500 arrives at the job site 800.

In step 1004, the T-shackle 412 is inserted into the lug 406 of the lifting bolt 108. In one embodiment, the T-shackle 412 is utilized to remove the panel 500 from the panel 500 forming system. In another embodiment, the T-shackle 412 is utilized to position the panel 500.

In step 1006, the insulated precast concrete sandwich panel 500 is removed from the panel 500 forming system via the reusable lifting apparatus 100. In one embodiment, the casting pin 612 and the block out 602 are removed from the panel 500. In another embodiment, the lifting insert 102 and the lifting bolt 108 are inserted into the void 510 of the panel 500, engaging the upper mount assembly 104 and the lower mount assembly 106 and forming the reusable lifting apparatus 100. In another embodiment, the panel 500 is removed from the panel 500 forming system as illustrated in FIGS. 7A-7C.

In step 1008, the insulated precast concrete sandwich panel 500 is positioned via the reusable lifting apparatus 100. In one embodiment, the panel 500 is positioned/set on a foundation as illustrated in FIGS. 7A-7C and/or FIGS. 8A-8D.

In step 1010, the lifting bolt 108 and the lifting insert 102 are removed from the panel 500. In one embodiment, the lifting bolt 108 and the lifting insert 102 are removed following removal of the panel 500 from the panel 500 forming system. In another embodiment, the lifting bolt 108 and the lifting insert 102 are removed following the positioning of the panel 500.

In step 1012, the void 510 and the sleeve 520 are filled. In one embodiment, the void 510 is filled with a block substantially similar to the shape of the void 510. For example, the block may be fabricated from a material including, but not limited to, insulation (e.g., insulation substantially similar to, or different from, the insulation layer 506), rubber, concrete, caulk, wood, or another space-filling material. In another embodiment, the sleeve 520 is filled with a selected material. For example, the selected material may include, but is not limited to, concrete (e.g., in a plug shape), caulk, rubber, wood, or another space-filling material.

Advantages of the present disclosure include a reusable lifting apparatus for an insulated precast concrete sandwich panel, where one or more of the components are insertable and/or removable from the panel and one or more components are embedded within one or more layers of the panel. Advantages of the present disclosure also include reusable components utilized during fabrication of the insulated precast concrete sandwich panel. Advantages of the present disclosure also include methods of positioning the insulated precast concrete sandwich panel via the reusable lifting apparatus. Advantages of the present disclosure are also directed to preventing thermal transfer by removing one or more components of the reusable lifting apparatus from the insulated precast concrete sandwich panel following installation of the panel.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A reusable lifting apparatus for a cured concrete sandwich panel, comprising:
    a first mount assembly embedded within a first cured concrete layer of a cured concrete sandwich panel;
    a second mount assembly embedded within a second cured concrete layer of the cured concrete sandwich panel;
    a lifting insert insertable within a void in one or more insulation layers between the first cured concrete layer and the second cured concrete layer of the cured concrete sandwich panel, wherein a portion of the lifting insert is alignable with the first mount assembly and the second mount assembly; and
    a lifting bolt insertable through a hole in the first cured concrete layer of the cured concrete sandwich panel and couplable to at least one of the first mount assembly, the second mount assembly, or the lifting insert, wherein the lifting insert is pivotable within the void about an axis through the lifting bolt,
    wherein the lifting insert and the lifting bolt are removable from and reusable in the cured concrete sandwich panel, wherein removing the lifting insert and the bolt from the cured concrete sandwich panel reduces thermal bridging between the first cured concrete layer and the second cured concrete layer of the cured concrete sandwich panel via the lifting insert and the lifting bolt.

2. The apparatus in claim 1, wherein the lifting insert comprises:
    a head portion including one or more holes;
    a body portion; and
    a tube portion,
    wherein the tube portion is alignable with the second mount assembly and the first mount assembly,
    wherein the lifting bolt is couplable at least one of the second mount assembly, the first mount assembly, or the tube portion.

3. The apparatus in claim 2, wherein the head portion and the body portion of the lifting insert are a selected width, wherein the head portion of the lifting insert includes one or more protrusions, wherein the one or more protrusions extend outside the selected width.

4. The apparatus in claim 3, wherein the lifting insert includes one or more bearing plates, wherein the one or more bearing plates are affixed to at least one of the one or more protrusions of the head portion of the lifting insert or the body portion of the lifting insert.

5. The apparatus in claim 1, wherein the first mount assembly comprises:
    a nut including a hole; and
    a plate including a hole, wherein the hole through the plate is aligned with the hole through the nut,
    wherein the lifting bolt enters a surface of the nut, wherein the lifting bolt passes through the hole of the nut and the hole of the bolt, wherein the lifting bolt exits the plate via an opening in a surface of the plate.

6. The apparatus in claim 5, wherein at least one of the hole through the nut or the hole through plate is threaded.

7. The apparatus in claim 5, wherein the nut includes an unmachined portion and a machined portion, wherein the nut is welded to the plate at an interface between the machined portion of the nut and a surface of the plate.

8. The apparatus in claim 1, wherein the second mount assembly comprises:
    a nut including a hole; and
    a plate including a hole, wherein the hole through the plate includes one or more bolt stops, wherein the hole through the plate is aligned with the hole through the nut,
    wherein at least one of the hole through the nut or the hole through the plate is threaded,
    wherein the lifting bolt enters a surface of the nut, wherein the lifting bolt passes through the hole of the nut and the hole of the bolt, wherein the lifting bolt is stopped by the one or more bolt stops.

9. The apparatus in claim 8, wherein the nut includes an unmachined portion and a machined portion, wherein the nut is welded to the plate at an interface between the machined portion of the nut and a surface of the plate.

10. The apparatus in claim 1, wherein at least one of the first mount assembly or the second mount assembly comprises a single casted component.

11. The apparatus in claim 1, wherein the lifting bolt comprises:
    a threaded shaft;
    a head; and
    a lug including one or more holes.

12. The apparatus in claim 11, wherein the threaded shaft and the head are a single casted component, wherein the lug is welded to the head.

13. The apparatus in claim 11, wherein the threaded shaft, the head, and the lug are a single casted component.

14. The apparatus in claim 1, wherein the void is substantially rectangular prism-shaped, wherein the substantially rectangular prism-shaped void includes a first side and a second side, wherein the first side and the second side are set at a selected angle from a substantially horizontal plane.

15. The apparatus in claim 14, wherein the selected angle ranges from 10 degrees to 80 degrees.

16. The apparatus in claim 15, wherein the selected angle is 45 degrees.

17. A system, comprising:
    a concrete sandwich panel, comprising:
        a first concrete layer;
        a second concrete layer; and
        one or more insulation layers located between the first layer and the second layer, wherein the one or more insulation layers include a void; and
    a reusable lifting apparatus, comprising:
        a first mount assembly embedded within the first layer of the concrete sandwich panel;
        a second mount assembly embedded within the second layer of the concrete sandwich panel;
        a lifting insert insertable within the void in the one or more insulation layers between the first layer and the second layer of the concrete sandwich panel, wherein a portion of the lifting insert is alignable with the first mount assembly and the second mount assembly; and
        a lifting bolt couplable to at least one of the first mount assembly, the second mount assembly, or the lifting insert through a hole in the first layer of the concrete sandwich panel, wherein the lifting insert is pivotable within the void about an axis through the lifting bolt,
        wherein the lifting insert and the lifting bolt are removable from the concrete sandwich panel so as to eliminate thermal bridging between the first layer and the second layer of the concrete sandwich panel via the lifting insert and the lifting bolt.

18. The system in claim 17, wherein the void in the one or more insulation layers is at least partially protected from poured concrete by a block out during fabrication of the concrete sandwich panel.

19. The system in claim 17, wherein the sleeve in the first layer of the concrete sandwich panel is at least partially protected from poured concrete by a casting pin during fabrication of the concrete sandwich panel.

20. The system in claim 17, wherein the concrete sandwich panel is in a first substantially planar orientation during fabrication, wherein the concrete sandwich panel is rotatable from the first substantially planar orientation to a second substantially planar orientation substantially perpendicular to the first substantially planar orientation via the lifting apparatus, wherein the concrete sandwich panel is rotatable from the second substantially planar orientation to a third substantially planar orientation substantially perpendicular to the first substantially planar orientation and the second substantially planar orientation via the lifting apparatus.

* * * * *